(12) United States Patent
Ikai et al.

(10) Patent No.: US 12,249,081 B2
(45) Date of Patent: Mar. 11, 2025

(54) COMPUTER-READABLE RECORDING MEDIUM STORING INFORMATION PROCESSING PROGRAM, INFORMATION PROCESSING METHOD, AND INFORMATION PROCESSING DEVICE

(71) Applicant: FUJITSU LIMITED, Kawasaki (JP)

(72) Inventors: Yoshiaki Ikai, Fujisawa (JP); Takahiro Saito, Asaka (JP)

(73) Assignee: FUJITSU LIMITED, Kawasaki (JP)

( * ) Notice: Subject to any disclaimer, the term of this patent is extended or adjusted under 35 U.S.C. 154(b) by 346 days.

(21) Appl. No.: 17/939,005

(22) Filed: Sep. 7, 2022

(65) Prior Publication Data
US 2023/0196592 A1 Jun. 22, 2023

(30) Foreign Application Priority Data

Dec. 22, 2021 (JP) ................. 2021-208429

(51) Int. Cl.
*G06T 7/246* (2017.01)
*G06V 10/44* (2022.01)
*G06V 40/10* (2022.01)

(52) U.S. Cl.
CPC ............ *G06T 7/251* (2017.01); *G06V 10/457* (2022.01); *G06V 40/10* (2022.01); *G06V 2201/07* (2022.01)

(58) Field of Classification Search
CPC ...... G06T 7/251; G06V 10/457; G06V 40/10; G06V 2201/07; G06V 10/7635; G06V 20/44; G06V 20/52; G06V 40/23; G06F 18/2323
See application file for complete search history.

(56) References Cited

U.S. PATENT DOCUMENTS

| | | | |
|---|---|---|---|
| 11,048,973 B1* | 6/2021 | Ramanathan | G06V 10/774 |
| 2013/0278501 A1* | 10/2013 | Bulzacki | G06F 18/2413 |
| | | | 345/157 |
| 2019/0220657 A1 | 7/2019 | Yabuki et al. | |
| 2021/0248885 A1* | 8/2021 | Huang | G06F 18/253 |

(Continued)

FOREIGN PATENT DOCUMENTS

| | | |
|---|---|---|
| WO | 2018/070414 A1 | 4/2018 |
| WO | 2021/130978 A1 | 7/2021 |

OTHER PUBLICATIONS

Author: Megha Nawhal) (Title: "Activity Graph Transformer for Temporal Action Localization") (Year: 2021) (p. 1-18).*

(Continued)

*Primary Examiner* — Chan S Park
*Assistant Examiner* — Sebastian-Sy Vuchi Ngo
(74) *Attorney, Agent, or Firm* — Fujitsu Intellectual Property Center

(57) ABSTRACT

A non-transitory computer-readable recording medium stores an information processing program for causing a computer to execute processing including: acquiring data that indicates a relationship between element actions for a plurality of element actions in an object period; acquiring an effective time that corresponds to an object action; and searching for a combination of two or more element actions that form the object action among the plurality of element actions for each divided section set by dividing the object period according to the acquired effective time on the basis of the acquired data.

11 Claims, 16 Drawing Sheets

(56) References Cited

U.S. PATENT DOCUMENTS

2022/0076003 A1\*　3/2022　Neo ..................... G06V 40/23
2023/0274580 A1\*　8/2023　Yao ..................... G06V 10/44
　　　　　　　　　　　　　　　　　　　　　　　382/107

OTHER PUBLICATIONS

Julio Vizcarra et al., "Knowledge Graph Retrieval and Analysis for the Evaluation of Customer Service in Video", JSAI Technical Report, Type 2 SIG, SIG-SWO-051-07, pp. 1-4, 2020 (Total 4 pages).

\* cited by examiner

COMPUTER-READABLE RECORDING MEDIUM STORING INFORMATION PROCESSING PROGRAM, INFORMATION PROCESSING METHOD, AND INFORMATION PROCESSING DEVICE

CROSS-REFERENCE TO RELATED APPLICATION

This application is based upon and claims the benefit of priority of the prior Japanese Patent Application No. 2021-208429, filed on Dec. 22, 2021, the entire contents of which are incorporated herein by reference.

FIELD

The embodiment discussed herein is related to an information processing program, an information processing method, and an information processing device.

BACKGROUND

Conventionally, there is a technology in which, by using a model obtained by machine learning, persons, objects, and the like appearing in a moving image are recognized, and further, an action of the recognized person, a relationship between the recognized persons, a relationship between the recognized person and object, and the like are recognized. The model is, for example, a deep neural network (DNN).

International Publication Pamphlet No. WO 2018/070414 and International Publication Pamphlet No. WO 2021/130978 are disclosed as related art.

SUMMARY

According to an aspect of the embodiments, a non-transitory computer-readable recording medium stores an information processing program for causing a computer to execute processing including: acquiring data that indicates a relationship between element actions for a plurality of element actions in an object period; acquiring an effective time that corresponds to an object action; and searching for a combination of two or more element actions that form the object action among the plurality of element actions for each divided section set by dividing the object period according to the acquired effective time on the basis of the acquired data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, for example, there is a technology in which a type of a basic motion is identified on the basis of movement of a feature point that is included in a consecutive frame and that corresponds to a predetermined part or a joint part of a body of an object person. Furthermore, for example, there is a technology in which two or more pieces of object posture data are extracted as object trajectory data representing transition of a posture of an object person from a plurality of pieces of object posture data corresponding to a plurality of pieces of object image data, and an operation of the object person is identified on the basis of the object trajectory data.

However, in the prior arts, there is a problem that a processing load for recognizing a specific action of a person tends to increase. For example, in a case where a specific action formed by two or more actions is recognized, a model is trained by using a moving image instead of a still image, and a processing load tends to increase.

In one aspect, it is an object of an embodiment to reduce a processing load needed for recognizing an action of an object.

Hereinafter, an embodiment of an information processing program, an information processing method, and an information processing device will be described in detail with reference to the drawings.

One Example of Information Processing Method According to Embodiment

Figure 1:
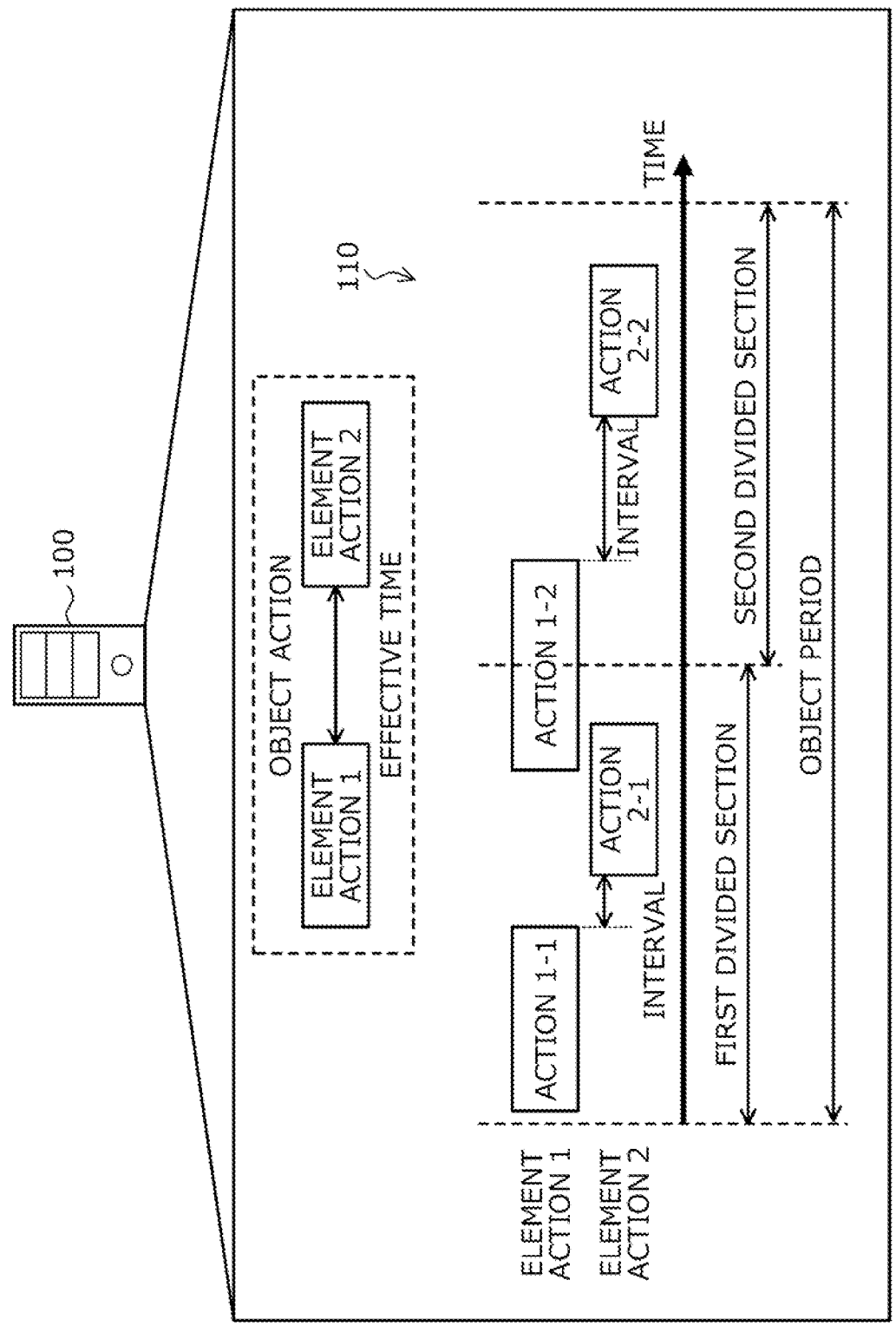
FIG. 1 is an explanatory diagram illustrating one example of an information processing method according to an embodiment.

FIG. 1 is an explanatory diagram illustrating one example of the information processing method according to the embodiment. An information processing device 100 is a computer for facilitating recognition of an action of an object. The action of the object is, for example, a relatively complex action. For example, it is considered that the more element actions that form an action, the more complex the action. The action of the object is, for example, an action by a person. The information processing device 100 is, for example, a server or a personal computer (PC).

Conventionally, a model such as a deep neural network (DNN) obtained by machine learning is used to try to recognize an action of an object appearing in a moving image. However, there is a problem that a processing load for recognizing the action of the object tends to increase. For example, when a model such as the DNN is trained, it is preferable to prepare several thousand or more pieces of training data, and the processing load tends to increase. Furthermore, for example, when a model that may recognize a complex action formed by a combination of relatively many element actions is trained, since the model is trained in consideration of a time series by using a moving image instead of a still image, the processing load tends to increase.

On the other hand, a method may be considered in which a DNN that detects skeleton coordinates of a person is used to recognize a time change of a skeleton position of a person appearing in a moving image and to try to recognize an action of the person on the basis of the time change of the skeleton position. For this method, for example, International Publication Pamphlet No. WO 2018/070414 described above may be referred to. In this method, when trying to recognize various actions, processing is performed from a beginning of a moving image for each action, and a processing load tends to increase.

Furthermore, a method may be considered in which an action appearing in a moving image is represented in graph data to try to recognize a relatively complex action on the basis of the graph data. For this method, for example, Reference Document 1 described below may be referred to. In this method, since the graph data corresponding to the moving image is generated, the longer a time of the moving image, the larger a scale of the graph data tends to increase, and a processing time and processing load needed for recognizing a relatively complex action tend to increase.

> Reference Document 1: Julio Vizcarra, Satoshi Nishimura, and Ken Fukuda. "Knowledge graph retrieval and analysis for the evaluation of customer service in video." (2020): SIG-SW0-051-07.

Thus, in the present embodiment, an information processing method capable of reducing a processing load needed for recognizing an action of an object will be described.

In FIG. 1, an object action is formed by, for example, a combination of two or more element actions. The object action is defined by, for example, a combination of two or more element actions and an effective time. The effective time indicates, for example, an upper limit regarding a time interval between the element actions. In the example of FIG. 1, the object action is formed by a combination of an element action 1 and an element action 2. The object action is formed by, for example, the combination of the element action 1 and the element action 2 whose time interval is within the effective time.

(1-1) The information processing device 100 acquires data 110 indicating a relationship between element actions for a plurality of element actions in an object period. The data 110 is, for example, graph data. The plurality of element actions includes, for example, element actions forming the object action. The information processing device 100 acquires the data 110 by, for example, recognizing the plurality of element actions in the object period on the basis of a moving image relating to the object period by using a predetermined model, and generating the data 110 indicating the relationship between the element actions. The predetermined model is, for example, a DNN. In the example of FIG. 1, the information processing device 100 acquires the data 110 indicating the relationship between the element actions for the element action 1 and the element action 2 in the object period. For example, an action 1-1 and an action 1-2 are the element actions 1. For example, an action 2-1 and an action 2-2 are the element actions 2.

(1-2) The information processing device 100 acquires the effective time corresponding to the object action. The information processing device 100 acquires, for example, the effective time corresponding to the object action, which is set in advance by a user and stored in a storage unit, by reading the effective time from the storage unit. The information processing device 100 may acquire the effective time corresponding to the object action by, for example, receiving input of the effective time corresponding to the object action on the basis of operation input by the user.

(1-3) The information processing device 100 sets a plurality of divided sections by dividing the object period according to the acquired effective time. The divided sections may overlap each other, for example. The information processing device 100 sets the plurality of divided sections by, for example, dividing the object period in a time unit longer than the effective time. In the example of FIG. 1, the information processing device 100 sets a first divided section and a second divided section by dividing the object period.

(1-4) The information processing device 100 recognizes the object action by searching for a combination of two or more element actions forming the object action among a plurality of element actions for each set divided section on the basis of the acquired data 110. For example, the information processing device 100 generates, for each set divided section, division data indicating a relationship between element actions for the element actions in the divided section on the basis of the acquired data 110. For example, the information processing device 100 searches for a combination of two or more element actions forming the object action among the element actions in the divided section indicated by the division data for each piece of generated division data.

For example, the information processing device 100 searches for the combination of the element action 1 and the element action 2 that form the object action and whose time interval is within the effective time among the element actions in the divided section indicated by the division data. For example, in the example of FIG. 1, the information processing device 100 searches for a combination of the action 1-1 and the action 2-1 that form the object action and whose time interval is within the effective time among the element actions in the first divided section. Similarly, for example, the information processing device 100 searches for a combination of the action 1-2 and the action 2-2 that form the object action and whose time interval is within the effective time among the element actions in the second divided section.

With this configuration, the information processing device 100 may facilitate recognition of the action of the object. The information processing device 100 may facilitate recognition of a relatively complex action of the object, for example. Since the information processing device 100 may dispense with the need to train a model that may recognize the action of the object, it is possible to suppress an increase in a processing time and a processing load. The information processing device 100 may suppress the increase in the processing time and the processing load even when a size of the data 110 is large.

Here, a case has been described where the information processing device 100 generates the data 110 indicating the relationship between the element actions. However, the present embodiment is not limited to this. For example, there may be a case where the information processing device 100 acquires the data 110 indicating the relationship between the element actions by receiving the data 110 from another computer. The another computer generates the data 110 indicating the relationship between the element actions by, for example, recognizing the plurality of element actions in the object period on the basis of the moving image relating to the object period by using the predetermined model.

Here, a case has been described where the information processing device 100 operates independently. However, the present embodiment is not limited to this. For example, there may be a case where the information processing device 100 cooperates with another computer. Furthermore, for example, there may be a case where a plurality of computers implements the functions as the information processing device 100 in a distributed manner. One example of the case where the information processing device 100 cooperates with another computer will be described later with reference to FIG. 2, for example.

(One Example of Information Processing System 200)

Next, one example of an information processing system 200 to which the information processing device 100 illustrated in FIG. 1 is applied will be described with reference to FIG. 2.

Figure 2:
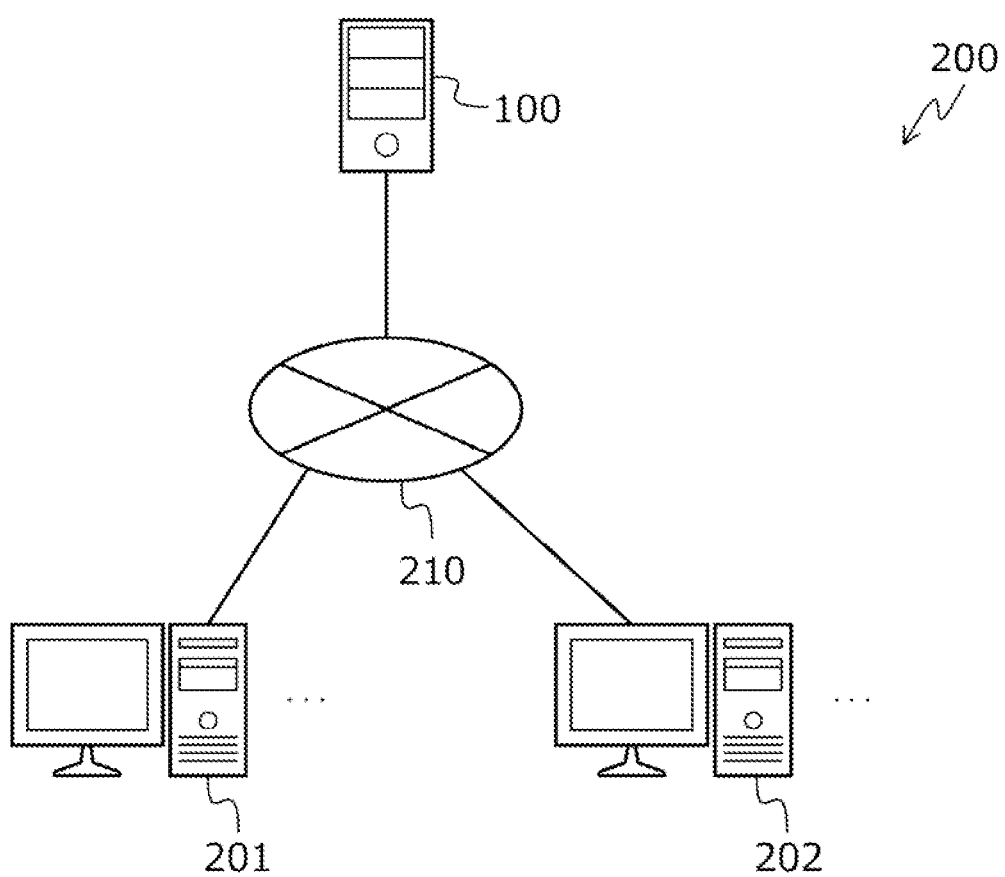
FIG. 2 is an explanatory diagram illustrating one example of an information processing system 200.

FIG. 2 is an explanatory diagram illustrating one example of the information processing system 200. In FIG. 2, the information processing system 200 includes the information processing device 100, an element action recognition device 201, and a client device 202.

In the information processing system 200, the information processing device 100 and the element action recognition device 201 are connected via a wired or wireless network 210. The network 210 is, for example, a local area network (LAN), a wide area network (WAN), or the Internet. Furthermore, in the information processing system 200, the information processing device 100 and the client device 202 are connected via the wired or wireless network 210.

The information processing device 100 is a computer for facilitating recognition of an object action. The information processing device 100 stores, for example, a combination of two or more element actions forming the object action and an effective time corresponding to the object action in association with each other. For example, the information processing device 100 receives, from the client device 202, and stores the combination of two or more element actions forming the object action and the effective time corresponding to the object action.

The information processing device 100 acquires, for example, data indicating a relationship between element actions for a plurality of element actions in an object period by receiving the data from the element action recognition device 201. The information processing device 100 acquires the effective time by, for example, reading the stored effective time corresponding to the object action. For example, the information processing device 100 sets a plurality of divided sections by dividing the object period according to the acquired effective time. For example, the information processing device 100 recognizes the object action by searching for a combination of two or more element actions forming the object action among a plurality of element actions for each set divided section on the basis of the acquired data.

For example, the information processing device 100 outputs a result of recognizing the object action so that a system user may refer to the result. For example, the information processing device 100 transmits the result of recognizing the object action to the client device 202. The information processing device 100 is, for example, a server or a PC.

The element action recognition device 201 is a computer for recognizing an element action. The element action recognition device 201 acquires, for example, a moving image related to an object period. The element action recognition device 201 acquires the moving image by, for example, receiving input of the moving image. For example, the element action recognition device 201 may include a camera device and acquire the moving image by the camera device. The element action recognition device 201 may acquire the moving image by, for example, receiving the moving image from another computer. The another computer is, for example, the client device 202.

The element action recognition device 201 recognizes the element action on the basis of, for example, the acquired moving image. For example, the element action recognition device 201 recognizes a plurality of element actions in the object period on the basis of the acquired moving image by using a predetermined model. For example, the element action recognition device 201 may further recognize another element action that is a combination of the recognized element actions. For example, the element action recognition device 201 generates data indicating a relationship between element actions for the recognized element actions, and transmits the data to the information processing device 100. The element action recognition device 201 is, for example, a server or a PC.

The client device 202 is a computer used by a system user. For example, the client device 202 transmits, to the information processing device 100, a combination of two or more element actions forming an object action and an effective time corresponding to the object action on the basis of operation input by the system user. For example, the client device 202 receives a result of recognizing the object action from the information processing device 100. For example, the client device 202 outputs the result of recognizing the object action so that the system user may refer to the result. The client device 202 is, for example, a PC, a tablet terminal, or a smartphone.

Here, a case has been described where the information processing device 100 and the element action recognition device 201 are different devices. However, the present embodiment is not limited to this. For example, there may be a case where the information processing device 100 has a function as the element action recognition device 201, and operates also as the element action recognition device 201. Here, a case has been described where the information processing device 100 and the client device 202 are different devices. However, the present embodiment is not limited to this. For example, there may be a case where the information processing device 100 has a function as the client device 202, and also operates as the client device 202.

(Hardware Configuration Example of Information Processing Device 100)

Next, a hardware configuration example of the information processing device 100 will be described with reference to FIG. 3.

Figure 3:
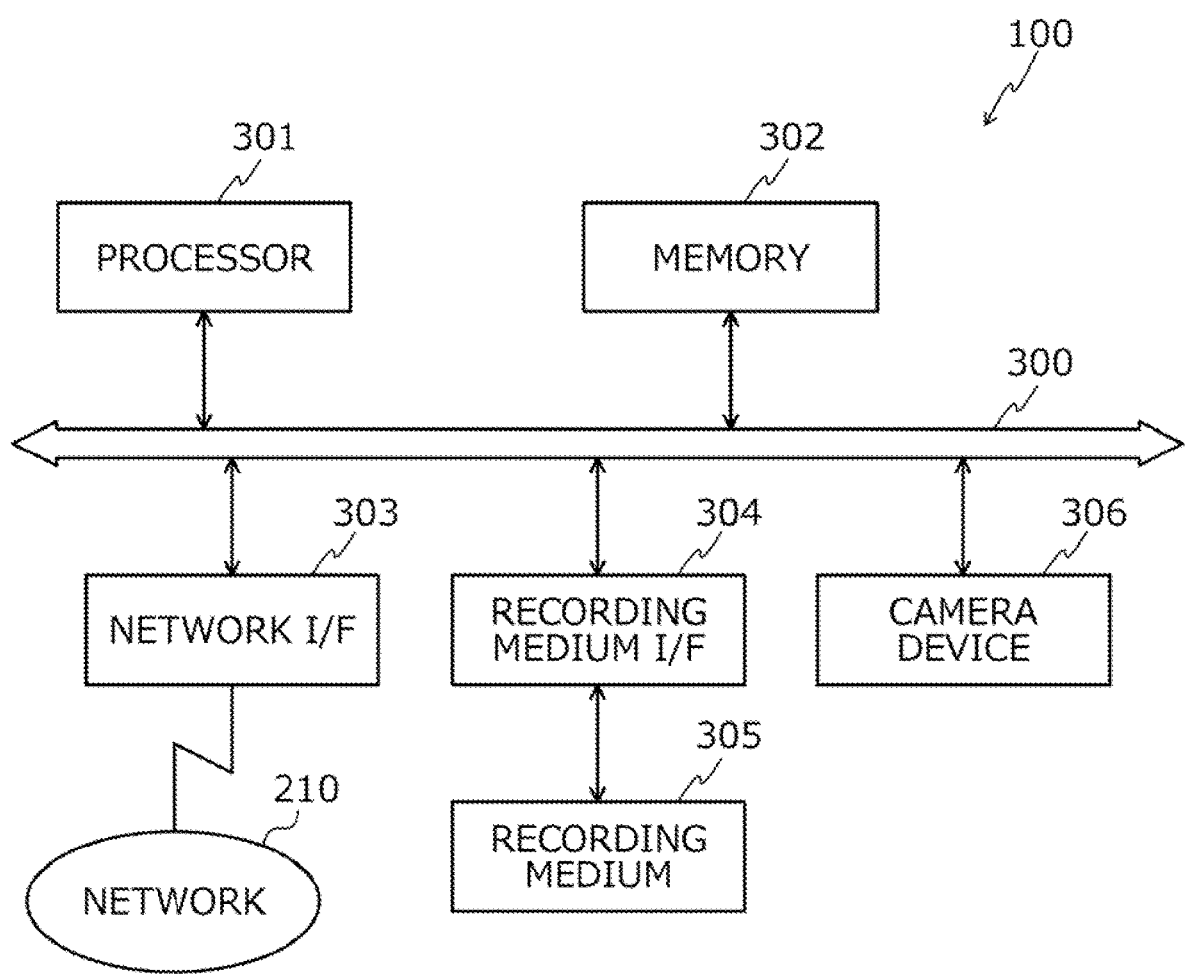
FIG. 3 is a block diagram illustrating a hardware configuration example of an information processing device 100.

FIG. 3 is a block diagram illustrating the hardware configuration example of the information processing device 100. In FIG. 3, the information processing device 100 includes a processor 301, a memory 302, a network interface (I/F) 303, a recording medium I/F 304, a recording medium 305, and a camera device 306. Furthermore, the individual components are connected to each other by a bus 300.

Here, the processor 301 performs overall control of the information processing device 100. The processor is a central processing unit (CPU), a graphics processing unit (GPU), or the like. The GPU is, for example, an arithmetic unit specialized in image processing.

The memory 302 includes, for example, a read only memory (ROM), a random access memory (RAM), and a flash ROM. For example, the flash ROM or the ROM stores various programs, and the RAM is used as a work area for the processor 301. The programs stored in the memory 302 are loaded into the processor 301 to cause the processor 301 to execute coded processing.

The network I/F 303 is connected to the network 210 through a communication line, and is connected to another computer via the network 210. Then, the network I/F 303 manages an interface between the network 210 and the inside, and controls input and output of data to and from another computer. The network I/F 303 is, for example, a modem or a LAN adapter.

The recording medium I/F 304 controls reading and writing of data from and to the recording medium 305 under the control of the processor 301. The recording medium I/F 304 is, for example, a disk drive, a solid state drive (SSD), or a universal serial bus (USB) port. The recording medium 305 is a nonvolatile memory that stores data written under the control of the recording medium I/F 304. The recording medium 305 is, for example, a disk, a semiconductor memory, or a USB memory. The recording medium 305 may be attachable to and detachable from the information processing device 100. The camera device 306 has an imaging element, and generates a moving image on the basis of a signal of the imaging element.

The information processing device 100 may include, for example, a keyboard, a mouse, a display, a printer, a scanner, a microphone, or a speaker, in addition to the components described above. Furthermore, the information processing device 100 may include a plurality of the recording medium I/Fs 304 and recording media 305. Furthermore, the information processing device 100 does not have to include the recording medium I/F 304 or the recording medium 305. The information processing device 100 does not have to include the camera device 306.

(Hardware Configuration Example of Element Action Recognition Device 201)

Since a hardware configuration example of the element action recognition device 201 is similar to the hardware configuration example of the information processing device 100 illustrated in FIG. 3, for example, description thereof will be omitted.

(Hardware Configuration Example of Client Device 202)

Since a hardware configuration example of the client device 202 is similar to the hardware configuration example of the information processing device 100 illustrated in FIG. 3, for example, description thereof will be omitted.

The client device 202 does not have to include, for example, a GPU.

(Functional Configuration Example of Information Processing Device 100)

Next, a functional configuration example of the information processing device 100 will be described with reference to FIG. 4.

Figure 4:
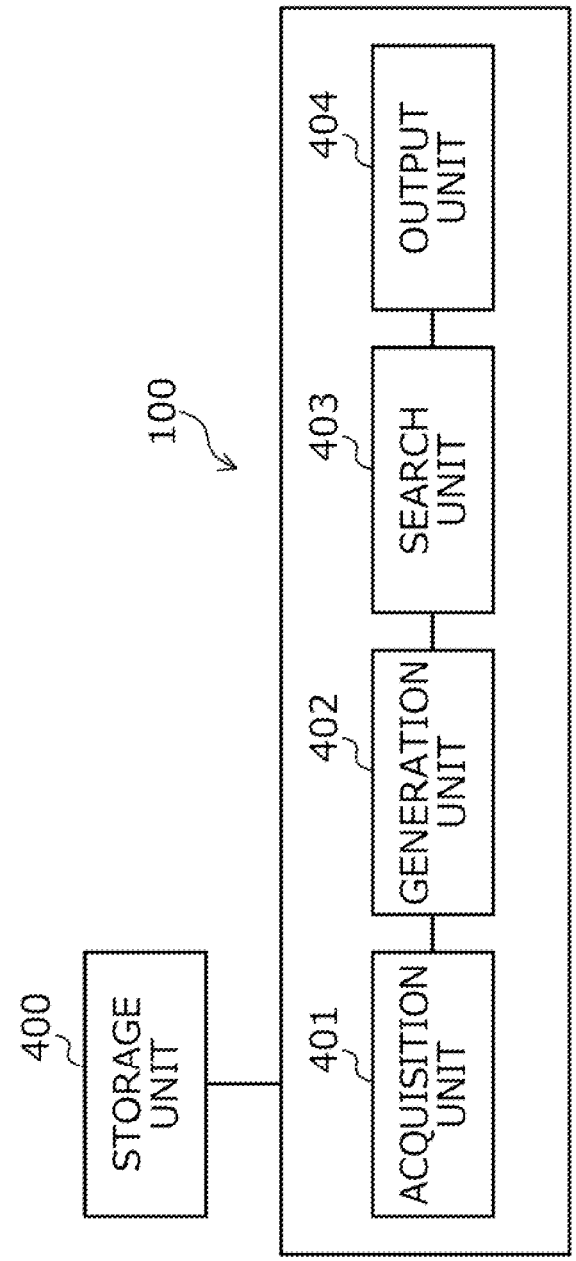
FIG. 4 is a block diagram illustrating a functional configuration example of the information processing device 100.

FIG. 4 is a block diagram illustrating the functional configuration example of the information processing device 100. As illustrated in FIG. 4, the information processing device 100 includes, for example, a storage unit 400, an acquisition unit 401, a generation unit 402, a search unit 403, and an output unit 404.

The storage unit 400 is implemented by, for example, a storage area such as the memory 302 or the recording medium 305 illustrated in FIG. 3. Hereinafter, a case will be described where the storage unit 400 is included in the information processing device 100. However, the present embodiment is not limited to this. For example, there may be a case where the storage unit 400 is included in a device different from the information processing device 100 and the information processing device 100 may refer to contents stored in the storage unit 400.

The acquisition unit 401 to the output unit 404 function as one example of a control unit. For example, the acquisition unit 401 to the output unit 404 implement functions thereof by causing the processor 301 to execute a program stored in a storage area such as the memory 302 or the recording medium 305 illustrated in FIG. 3 or by the network I/F 303. A processing result of each functional unit is stored in, for example, a storage area such as the memory 302 or the recording medium 305 illustrated in FIG. 3.

The storage unit 400 stores various types of information to be referred to or updated in processing of each functional unit. The storage unit 400 stores, for example, a moving image in an object period. The moving image is acquired by, for example, the acquisition unit 401. The moving image includes, for example, a plurality of frames.

The storage unit 400 stores, for example, a type of action to be treated as an element action. The action to be treated as an element action is, for example, a type of action that may be detected by using a predetermined model. The predetermined model is, for example, a DNN. The action to be treated as an element action may be, for example, an action formed by a combination of two or more element actions. The type of action to be treated as an element action is set in advance by a user, for example. The type of action to be treated as an element action may be acquired by, for example, the acquisition unit 401.

The storage unit 400 stores, for example, a predetermined model. The predetermined model is, for example, a model for making it possible to detect the action to be treated as an element action. The predetermined model is, for example, a model that makes it possible to recognize a person, a skeleton, an object, or the like to make it possible to detect the action to be treated as an element action. The predetermined model is, for example, a model that makes it possible to recognize a skeleton position of a person. The predetermined model is, for example, a DNN. The predetermined model is set in advance by a user, for example. The predetermined model may be acquired by, for example, the acquisition unit 401.

The storage unit 400 stores, for example, a first recognition rule that makes it possible to recognize an element action on the basis of a result recognized by the predetermined model. The first recognition rule is set in advance by a user, for example. The first recognition rule may be acquired by, for example, the acquisition unit 401. The storage unit 400 stores, for example, a second recognition rule that makes it possible to recognize a combination of two or more element actions forming the action to be treated as an element action. The second recognition rule is set in advance by the user, for example. The second recognition rule may be acquired by, for example, the acquisition unit 401.

The storage unit 400 stores, for example, a type of action to be treated as an object action. The action to be treated as an object action is, for example, an action formed by a combination of two or more element actions. The action to be treated as an object action is defined by, for example, an effective time and a combination of two or more element actions. The action to be treated as an object action is, for example, an action formed by a combination of two or more element actions in which a time interval between at least any of element actions is within the effective time. The action to be treated as an object action is, for example, a type of action that may not be detected by using a predetermined model. The type of action to be treated as an object action is set in advance by a user, for example. The type of action to be treated as an object action may be acquired by, for example, the acquisition unit 401.

The storage unit 400 stores, for example, the effective time corresponding to the object action. The effective time indicates, for example, an upper limit of a time interval between element actions. The effective time is set in advance by a user, for example. The effective time may be acquired by, for example, the acquisition unit 401.

The storage unit 400 stores, for example, a third recognition rule that makes it possible to recognize an object action. For example, the storage unit 400 stores the third recognition rule that makes it possible to recognize a combination of two or more element actions in which a time interval between at least any of element actions is within an effective time and which form the action to be treated as an object action. The third recognition rule is set in advance by a user, for example. The third recognition rule may be acquired by, for example, the acquisition unit 401.

The storage unit 400 stores, for example, relationship data indicating a relationship between element actions for a plurality of element actions in the object period. The relationship data indicates, for example, attribute information regarding each element action of a plurality of element actions, an order relationship between element actions, and an inclusion relationship between element actions. The attribute information indicates, for example, a person who has performed an element action or a time when an element action has been performed. The relationship data is, for example, graph data indicating a graph structure formed by nodes corresponding to element actions.

For example, the graph structure is formed by a node indicating an element action in association with a time when the element action has been performed, and an edge indicating an inclusion relationship between an element action and another element action formed by a combination of two or more element actions including the element action. There may be a case where the relationship data is not the graph data, for example. The relationship data is acquired by, for example, the acquisition unit 401. For example, the relationship data may not be acquired by the acquisition unit 401 and may be generated by the generation unit 402.

The acquisition unit 401 acquires various types of information to be used for processing of each functional unit. The acquisition unit 401 stores the acquired various types of information in the storage unit 400, or outputs the acquired various types of information to each functional unit. Furthermore, the acquisition unit 401 may output the various types of information stored in the storage unit 400 to each functional unit. The acquisition unit 401 acquires the various types of information on the basis of, for example, operation input by a user. The acquisition unit 401 may receive the various types of information from, for example, a device different from the information processing device 100.

The acquisition unit 401 acquires, for example, a type of action to be treated as an element action. For example, the acquisition unit 401 acquires the type of action to be treated as an element action by receiving input of the type of action to be treated as an element action on the basis of operation input by a user. For example, the acquisition unit 401 may acquire the type of action to be treated as an element action by receiving the type of action to be treated as an element action from another computer. The another computer is, for example, the client device 202.

The acquisition unit 401 acquires, for example, a predetermined model that makes it possible to detect the action to be treated as an element action. For example, the acquisition unit 401 acquires the predetermined model by receiving input of the predetermined model on the basis of operation input by a user. For example, the acquisition unit 401 may acquire the predetermined model by receiving the predetermined model from another computer. The another computer is, for example, the client device 202.

The acquisition unit 401 acquires, for example, the first recognition rule. For example, the acquisition unit 401 acquires the first recognition rule by receiving input of the first recognition rule on the basis of operation input by a user. For example, the acquisition unit 401 may acquire the first recognition rule by receiving the first recognition rule from another computer. The another computer is, for example, the client device 202.

The acquisition unit 401 acquires, for example, the second recognition rule that makes it possible to recognize two or more element actions forming the action to be treated as an element action. For example, the acquisition unit 401 acquires the second recognition rule by receiving input of the second recognition rule on the basis of operation input by a user. For example, the acquisition unit 401 may acquire the second recognition rule by receiving the second recognition rule from another computer. The another computer is, for example, the client device 202.

The acquisition unit 401 acquires, for example, the third recognition rule. For example, the acquisition unit 401 acquires the third recognition rule by receiving input of the third recognition rule on the basis of operation input by a user. For example, the acquisition unit 401 may acquire the third recognition rule by receiving the third recognition rule from another computer. The another computer is, for example, the client device 202.

The acquisition unit 401 acquires, for example, a type of action to be treated as an object action. For example, the acquisition unit 401 acquires the type of action to be treated as an object action by receiving input of the type of action to be treated as an object action on the basis of operation input by a user. For example, the acquisition unit 401 may acquire the type of action to be treated as an object action by receiving the type of action to be treated as an object action from another computer. The another computer is, for example, the client device 202.

The acquisition unit 401 acquires, for example, an effective time corresponding to an object action. For example, the acquisition unit 401 acquires the effective time corresponding to the object action by receiving input of the effective time corresponding to the object action on the basis of operation input by a user. For example, the acquisition unit 401 may acquire the effective time corresponding to the object action by receiving the effective time corresponding to the object action from another computer. The another computer is, for example, the client device 202.

The acquisition unit 401 acquires a moving image in an object period. For example, the acquisition unit 401 acquires the moving image in the object period by receiving input of the moving image in the object period on the basis of operation input by a user. For example, the acquisition unit 401 may acquire the moving image in the object period by receiving the moving image in the object period from another computer. The another computer is, for example, the client device 202. At this time, in a case where relationship data is not generated in the generation unit 402 and the relationship data is acquired in the acquisition unit 401, the acquisition unit 401 does not have to acquire the moving image in the object period.

The acquisition unit 401 acquires, for example, relationship data indicating a relationship between element actions for a plurality of element actions in the object period. For example, the acquisition unit 401 acquires the relationship data by receiving input of the relationship data on the basis of operation input by a user. For example, the acquisition unit 401 may acquire the relationship data by receiving the relationship data from another computer. The another computer is, for example, the client device 202. At this time, in a case where the relationship data is generated in the generation unit 402, the acquisition unit 401 does not have to acquire the relationship data.

The acquisition unit 401 may receive a start trigger to start processing of any one of the functional units. The start trigger is, for example, predetermined operation input by a user. The start trigger may be, for example, reception of predetermined information from another computer. The start trigger may be, for example, output of predetermined information by any one of the functional units. The acquisition unit 401 may receive, for example, acquisition of the moving image as a start trigger to start processing of the generation unit 402. The acquisition unit 401 may receive, for example, acquisition of the relationship data as a start trigger to start processing of the search unit 403.

The generation unit 402 detects an element action. The generation unit 402 detects, for example, on the basis of a result of recognizing a thing appearing in a moving image in an object period, which is acquired by the acquisition unit 401, and a first recognition rule, an element action related to the thing by using a predetermined model. For example, the generation unit 402 detects, on the basis of a result of recognizing a skeleton position of a person appearing in the moving image on the basis of the moving image, an element action related to the person by using the predetermined model. The generation unit 402 may further detect, for example, another element action that is a combination of the detected element actions. For example, the generation unit 402 detects another element action that is a combination of the detected element actions on the basis of the second recognition rule.

The generation unit 402 generates relationship data indicating a relationship between element actions for a plurality of element actions in the object period on the basis of the detected element actions. The generation unit 402 generates, for example, the relationship data that includes the detected element action in association with a time when the element action has been performed, and indicates an order relationship, an inclusion relationship, and the like between the element actions. With this configuration, the generation unit 402 may make it possible to recognize an object action.

The search unit 403 sets a plurality of divided sections by dividing an object period on the basis of an effective time acquired by the acquisition unit 401. The divided sections may overlap each other, for example. The search unit 403 sets the plurality of divided sections by, for example, dividing the object period in a time unit longer than the effective time. With this configuration, the search unit 403 may set the plurality of divided sections obtained by dividing the object period so as to reduce a processing load needed for recognizing an object action.

The search unit 403 may set the plurality of divided sections by dividing the object period so that, for example, the divided sections overlap each other for at least the acquired effective time or more. With this configuration, the search unit 403 may set the plurality of divided sections obtained by dividing the object period so as to reduce a processing load needed for recognizing an object action. Furthermore, the search unit 403 may facilitate recognition of the object action performed over a time point at a beginning or end of the divided section.

The search unit 403 recognizes the object action by searching for a combination of two or more element actions forming the object action among a plurality of element actions for each set divided section on the basis of relationship data acquired by the acquisition unit 401. For example, the search unit 403 searches for, for each set divided section, the combination of two or more element actions forming the object action, in which a time interval between at least any of the element actions in the combination is the acquired effective time or less.

For example, the search unit 403 extracts, for each divided section, partial data corresponding to the divided section from the relationship data. For example, the search unit 403 searches for the combination of two or more element actions forming the object action on the basis of the extracted partial data for each divided section with reference to the third recognition rule. For example, the search unit 403 searches for the combination of two or more element actions forming the object action, in which a time interval between the element actions is the acquired effective time or less, on the basis of the extracted partial data for each divided section. With this configuration, the search unit 403 may recognize the object action while reducing a processing load needed for recognizing the object action.

The search unit 403 may determine, for example, whether or not a part of the element actions included in the combination of two or more element actions forming the object action are present in the first divided section among the divided sections set by dividing the object period. For example, when a part of the element actions included in the combination of two or more element actions forming the object action is present, the search unit 403 searches for remaining element actions included in the combination in the second divided section after the first divided section.

For example, the search unit 403 may determine, in a combination of the part of element actions in the first divided section and the remaining element actions in the second divided section, whether or not a time interval between the element actions is the acquired effective time or less. For example, the search unit 403 specifies, as the combination of two or more element actions forming the object action, the combination of the part of element actions in the first divided section and the remaining element actions in the second divided section, which is determined to be the effective time or less. With this configuration, the search unit 403 may recognize the combination of two or more element actions forming the object action over an end of the first divided section.

The output unit 404 outputs a processing result of at least any one of the functional units. An output format is, for example, display on a display, print output to a printer, transmission to an external device by the network I/F 303, or storage in a storage area such as the memory 302 or the recording medium 305. With this configuration, the output unit 404 makes it possible to notify a user of the processing result of at least any one of the functional units, and may improve convenience of the information processing device 100.

The output unit 404 outputs a result of search by the search unit 403. The output unit 404 outputs, for example, an object action recognized as a result of the search by the search unit 403 so that a user may refer to the object action. For example, the output unit 404 outputs the object action recognized by the search unit 403 so that the user may refer to the object action together with information that makes it possible to specify a time point at a start or end of the object action.

For example, the output unit 404 displays the object action recognized by the search unit 403 on the display together with the information that makes it possible to specify the time point at the start or end of the object action. For example, the output unit 404 may transmit, to another computer, the object action recognized by the search unit 403 together with the information that makes it possible to specify the time point at the start or end of the object action. The another computer is, for example, the client device 202. With this configuration, the output unit 404 may make a result of recognizing the object action available to a user.

Here, a case has been described where the information processing device 100 includes the generation unit 402. However, the present embodiment is not limited to this. For example, there may be a case where the information processing device 100 does not include the generation unit 402. In this case, for example, it is preferable that the information processing device 100 may communicate with another computer including the generation unit 402. The another computer is, for example, the element action recognition device 201.

(First Operation Example of Information Processing Device 100)

Next, a first operation example of the information processing device 100 will be described with reference to FIGS. 5 to 7.

Figure 5:
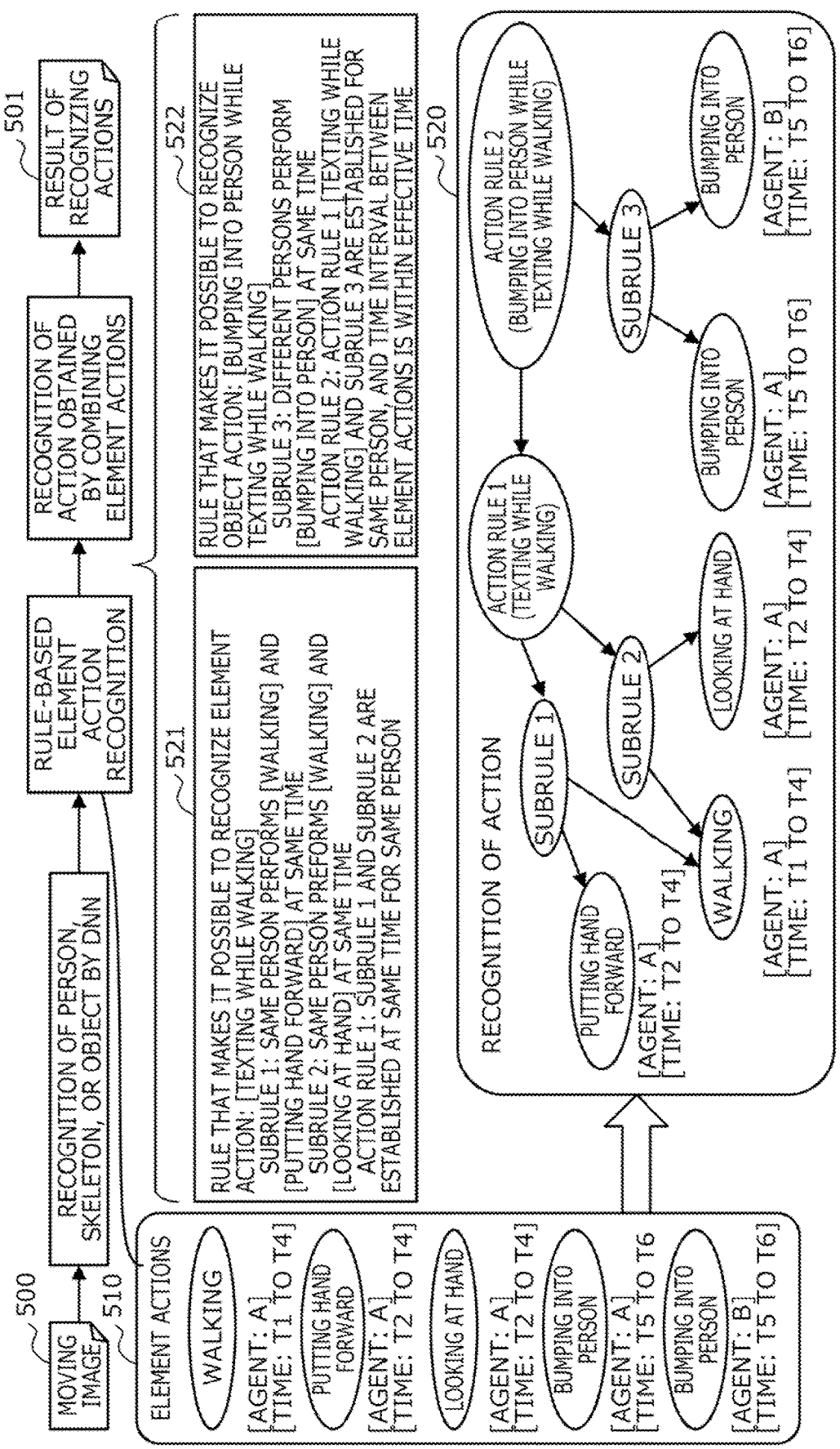
FIG. 5 is an explanatory diagram (part 1) illustrating a first operation example of the information processing device 100.
Figure 6:
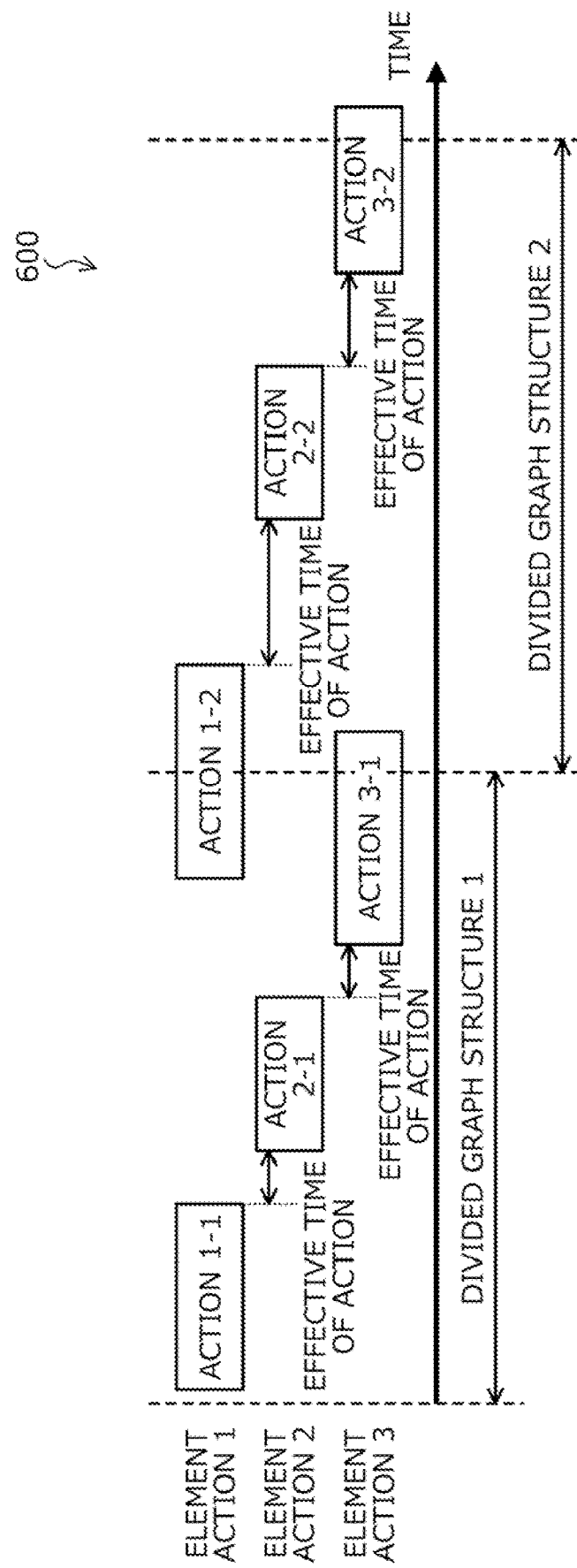
FIG. 6 is an explanatory diagram (part 2) illustrating the first operation example of the information processing device 100.
Figure 7:
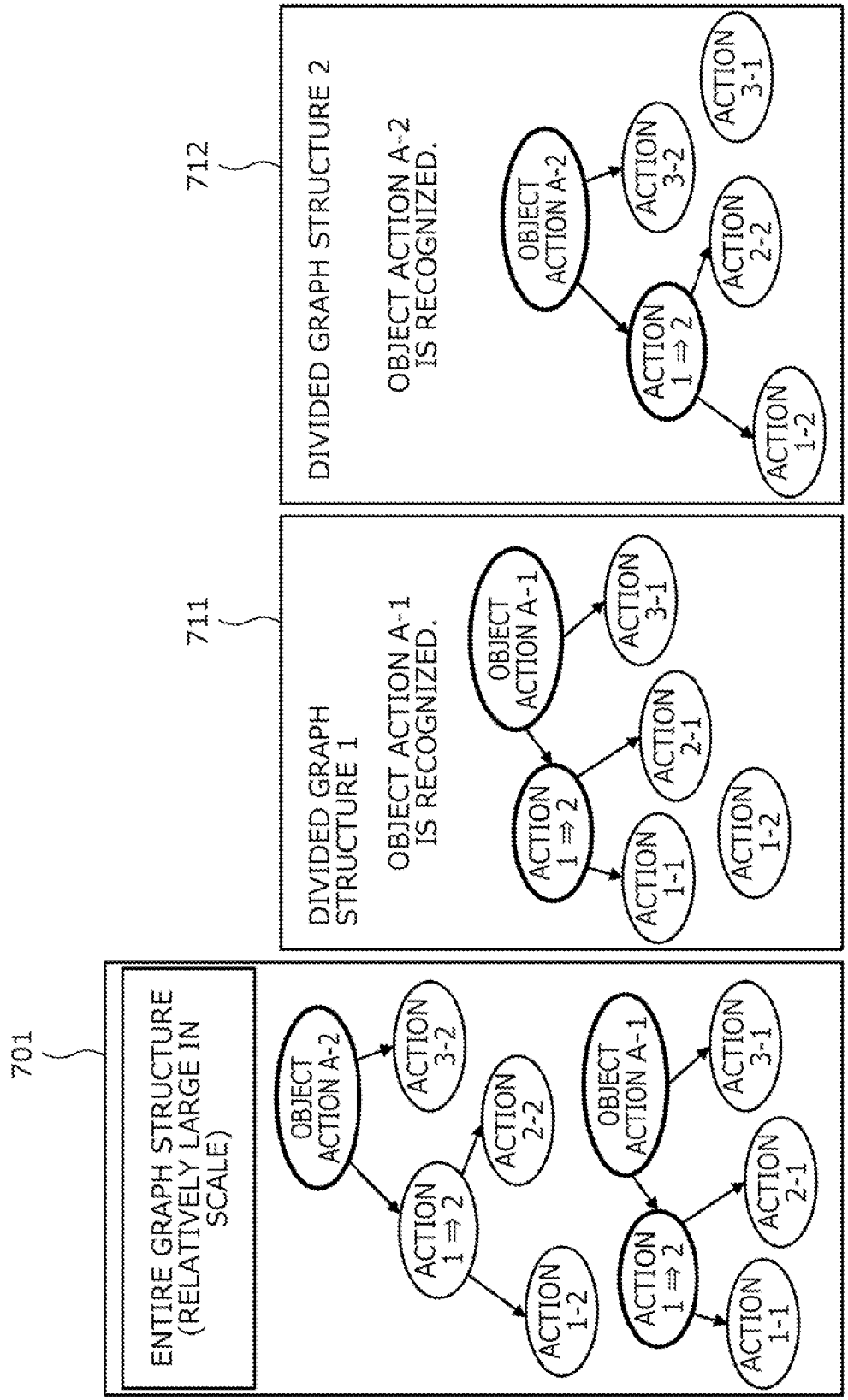
FIG. 7 is an explanatory diagram (part 3) illustrating the first operation example of the information processing device 100.

FIGS. 5 to 7 are explanatory diagrams illustrating the first operation example of the information processing device 100. In FIG. 5, (5-1) the information processing device 100 acquires a moving image 500. The information processing device 100 includes a DNN that makes it possible to recognize a person, a skeleton, an object, or the like appearing in the moving image 500. By using the DNN, the information processing device 100 recognizes the person, the skeleton, the object, or the like appearing in the moving image 500.

(5-2) The information processing device 100 has an element action recognition rule that makes it possible to recognize an element action appearing in the moving image 500 on the basis of output of the DNN. With reference to the element action recognition rule, the information processing device 100 recognizes the element action appearing in the moving image 500 on the basis of a result of recognizing the person, the skeleton, the object, or the like appearing in the moving image 500. For example, the information processing device 100 recognizes an element action such as "walking", "putting a hand forward", "looking at a hand", "bumping into a person", or the like, and specifies an agent who has performed the recognized action, a time when the element action has been performed, and the like.

(5-3) The information processing device 100 has a combination action recognition rule that makes it possible to recognize another element action by combining element actions. The combination action recognition rule is, for example, a rule 521. The rule 521 is a rule for recognizing an element action "texting while walking" by combining, for example, the element action "walking", the element action "putting a hand forward", and the element action "looking at a hand" by the same agent.

For example, the rule 521 indicates a subrule 1, a subrule 2, and an action rule 1 as conditions for acknowledging presence of the element action "texting while walking". The subrule 1 indicates, for example, that the same person performs the element action [walking] and the element action [putting a hand forward] at the same time. The subrule 2 indicates, for example, that the same person performs the element action [walking] and the element action [looking at a hand] at the same time. The action rule 1 indicates, for example, that the subrule 1 and the subrule 2 are established at the same time for the same person.

The information processing device 100 recognizes a new element action on the basis of the recognized element actions with reference to the combination action recognition rule. For example, the information processing device 100 recognizes the element action such as "texting while walking", and specifies an agent who has performed the recognized action, a time when the element action has been performed, and the like.

With this configuration, the information processing device 100 may recognize an element action group indicated by a reference numeral 510. The information processing device 100 stores a result of recognizing the element actions in a graph format. The information processing device 100 generates and stores relationship data representing a graph 520 indicating a relationship among the recognized element actions, the element action recognition rule, and the combination action recognition rule. The relationship data is, for example, graph data.

(5-4) The information processing device 100 has an object action recognition rule that makes it possible to recognize an object action. The object action recognition rule is, for example, a rule 522. The rule 522 is, for example, a rule for recognizing an object action "bumping into a person while texting while walking" by combining the element action "bumping into a person" and the element action "texting while walking" related to the same agent, in which a time interval between the element actions is within an effective time.

For example, the rule 522 indicates a subrule 3 and an action rule 2 as conditions for acknowledging presence of the element action "bumping into a person while texting while walking". The subrule 3 indicates, for example, that different persons perform the element action [bumping into a person] at the same time. The action rule 2 indicates, for example, that the action rule 1 and the subrule 3 are established for the same person, and the time interval between the element actions is within the effective time.

For example, the information processing device 100 recognizes the object action such as "bumping into a person while texting while walking", and specifies an agent who has performed the object action, a time when the object action has been performed, and the like. The information processing device 100 outputs a result 501 of recognizing the element action and the object action.

With this configuration, the information processing device 100 may recognize the object action. The information processing device 100 stores a result of recognizing the object action in a graph format. The information processing device 100 updates the relationship data representing the graph 520 so as to indicate a relationship between the recognized element actions and the object action recognition rule. Next, description of FIG. 6 will be made, and a specific example in which the information processing device 100 recognizes an object action will be described.

In FIG. 6, it is assumed that the object action is formed by a combination of an element action 1, an element action 2, and an element action 3, in which a time interval between the respective element actions is within an effective time. As in FIG. 5, it is assumed that, as a result of recognizing the element actions, the information processing device 100 generates and stores graph data representing a graph structure indicating a relationship between element actions for a plurality of element actions in an object period, as indicated by a reference numeral 600. The plurality of element actions includes an action 1-$i$ as the element action 1, an action 2-$j$ as the element action 2, and an action 3-$k$ as the element action 3. The reference i denotes a positive integer. The reference j denotes a positive integer. The reference k denotes a positive integer.

The information processing device 100 sets a plurality of divided sections by dividing the object period according to the effective time. The information processing device 100 sets, for example, each of portions obtained by dividing the object period in a time unit longer than the effective time as the divided section. The information processing device 100 extracts a plurality of pieces of partial data representing divided graph structures corresponding to the respective divided sections different from each other from the graph structure represented by relationship data. In the example of FIG. 6, the information processing device 100 extracts partial data representing a divided graph structure 1 including an action 1-1, an action 2-1, an action 3-1, and an action 1-2. In the example of FIG. 6, the information processing device 100 extracts partial data representing a divided graph structure 2 including the action 3-1, the action 1-2, an action 2-2, and an action 3-2.

The information processing device 100 recognizes the object action for each divided section on the basis of the partial data corresponding to the divided section. In the example of FIG. 6, the information processing device 100 recognizes an object action formed by a combination of the action 1-1, the action 2-1, and the action 3-1 on the basis of the partial data representing the divided graph structure 1. The information processing device 100 recognizes an object action formed by a combination of the action 1-2, the action 2-2, and the action 3-2 on the basis of the partial data representing the divided graph structure 2. With this configuration, the information processing device 100 may recognize the object action for each piece of partial data. Next, description of FIG. 7 will be made.

As illustrated in FIG. 7, a graph structure 701 indicating a relationship between element actions for a plurality of element actions in an object period is relatively large in scale. Therefore, when trying to recognize various object actions on the basis of the graph structure 701 by a prior art, the entire graph structure 701 is repeatedly inspected, which tends to increase a processing load. For example, in the prior art, when trying to recognize various object actions on the basis of the graph structure 701, a total of eight combination patterns formed by combining each of two element actions 1, two element actions 2, and two element actions 3 are inspected.

On the other hand, a graph structure 711 obtained by dividing the graph structure 701 is relatively small in scale. The graph structure 711 corresponds to, for example, the divided graph structure 1 illustrated in FIG. 6. Therefore, when recognizing various object actions on the basis of the graph structure 711, the information processing device 100 may suppress an increase in a processing load. For example, the information processing device 100 inspects a total of two combination patterns formed by combining each of two element actions 1, one element action 2, and one element action 3.

Similarly, a graph structure 712 obtained by dividing the graph structure 701 is relatively small in scale. The graph structure 712 corresponds to, for example, the divided graph structure 2 illustrated in FIG. 6. Therefore, when recognizing various object actions on the basis of the graph structure 712, the information processing device 100 may suppress an increase in a processing load. For example, the information processing device 100 inspects a total of two combination patterns formed by combining each of one element action 1, one element action 2, and two element actions 3.

In this way, the information processing device 100 may reduce a processing time and processing load needed for recognizing the object action. The information processing device 100 may suppress the number of combination patterns to be inspected to four as compared with the prior art, for example. For example, in a case where a moving image is relatively long and the graph structure 701 is 100 times larger in scale, the information processing device 100 may suppress the number of combination patterns to be inspected from about 8 million to about 400.

For example, in the prior art, in a case where the graph structure 701 is 100 times larger in scale, a total of 8 million combination patterns formed by combining each of 200 element actions 1, 200 element actions 2, and 200 element actions 3 are inspected. On the other hand, even when the graph structure 701 is 100 times larger in scale, the information processing device 100 may divide the object period into 200, recognize the object action from the graph structure corresponding to each divided section, only inspect about 400 combination patterns, and obtain results of inspection equivalent to those of the prior art. Therefore, the information processing device 100 may suppress the number of combination patterns to be inspected to about $\frac{1}{20,000}$, and may reduce a processing time and processing load needed for recognizing the object action.

(Generation Processing Procedure in First Operation Example)

Next, one example of a generation processing procedure executed by the information processing device 100 in the first operation example will be described with reference to FIG. 8. Generation processing is implemented by, for example, the processor 301, a storage area such as the memory 302 or the recording medium 305, and the network I/F 303 illustrated in FIG. 3.

Figure 8:
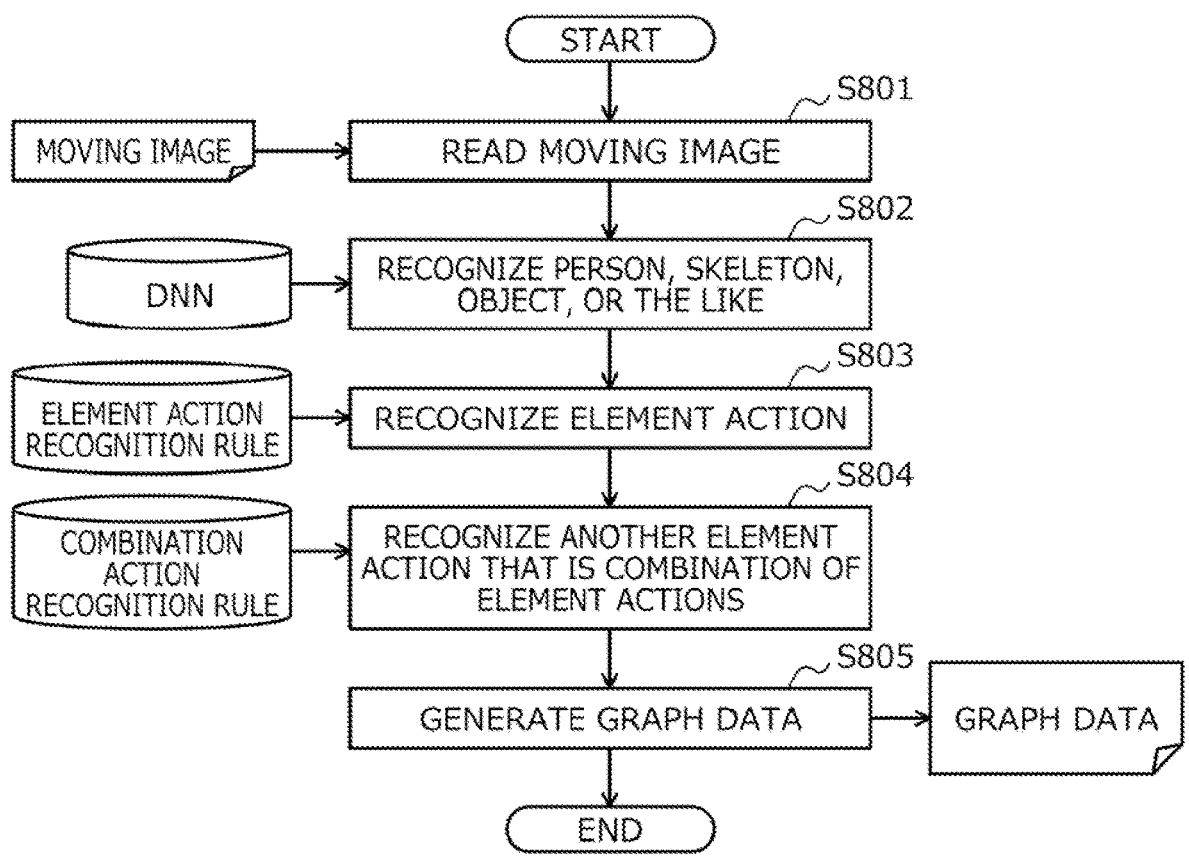
FIG. 8 is a flowchart illustrating one example of a generation processing procedure in the first operation example.

FIG. 8 is a flowchart illustrating one example of the generation processing procedure in the first operation example. In FIG. 8, the information processing device 100 reads a moving image in an object period (Step S801).

Next, by using a DNN, the information processing device 100 recognizes a person, a skeleton, an object, or the like appearing in the moving image (Step S802). Then, on the basis of a result of recognizing the person, the skeleton, the object, or the like, the information processing device 100 recognizes an element action in the object period with reference to the element action recognition rule (Step S803).

Next, the information processing device 100 recognizes another element action that is a combination of the recognized element actions with reference to the combination action recognition rule (Step S804). Then, the information processing device 100 generates and stores graph data indicating the recognized element action in association with a time of the element action and indicating a relationship between the recognized element actions (Step S805). Thereafter, the information processing device 100 ends the generation processing.

(Recognition Processing Procedure in First Operation Example)

Next, one example of a recognition processing procedure executed by the information processing device 100 in the first operation example will be described with reference to FIG. 9. Recognition processing in the first operation example is implemented by, for example, the processor 301, a storage area such as the memory 302 or the recording medium 305, and the network I/F 303 illustrated in FIG. 3.

Figure 9:
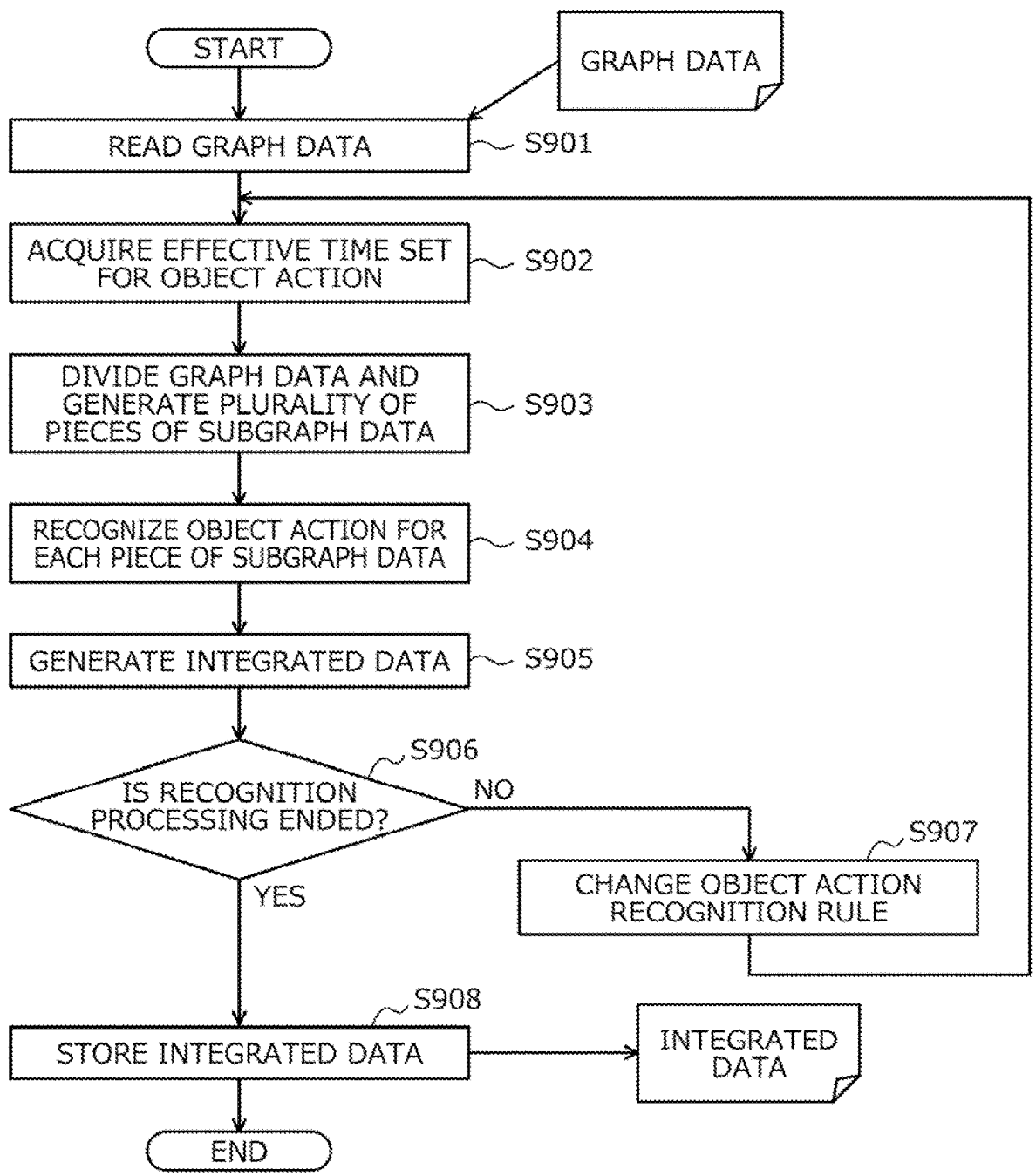
FIG. 9 is a flowchart illustrating one example of a recognition processing procedure in the first operation example.

FIG. 9 is a flowchart illustrating one example of the recognition processing procedure in the first operation example. In FIG. 9, the information processing device 100 reads graph data indicating a relationship between element actions (Step S901).

Next, the information processing device 100 acquires an effective time set for an object action with reference to the recognition rule that makes it possible to recognize any one of object actions (Step S902). Then, the information processing device 100 divides the graph data along a time axis on the basis of the effective time set for the object action, and generates a plurality of pieces of subgraph data (Step S903).

Next, the information processing device 100 recognizes the object action for each piece of subgraph data with reference to the object action recognition rule that makes it possible to recognize any one of object actions (Step S904). Then, the information processing device 100 generates integrated data obtained by integrating results of recognizing the object action this time (Step S905).

Next, the information processing device 100 determines whether or not to end the recognition processing (Step S906). The information processing device 100 determines that the recognition processing is ended in a case where, for example, recognition of each object action of a plurality of preset object actions is ended. Here, in a case where the recognition processing is not ended (Step S906: No), the information processing device 100 proceeds to processing in Step S907. On the other hand, in a case where the recognition processing is ended (Step S906: Yes), the information processing device 100 proceeds to processing in Step S908.

In Step S907, the information processing device 100 changes the object action recognition rule to be referred to so as to refer to an object action recognition rule that makes it possible to recognize another object action (Step S907). Then, the information processing device 100 returns to the processing in Step S902.

In Step S908, the information processing device 100 stores the integrated data (Step S908). Then, the information processing device 100 ends the recognition processing. With this configuration, the information processing device 100 may facilitate recognition of the object action.

(Second Operation Example of Information Processing Device 100)

Next, a second operation example of the information processing device 100 will be described with reference to FIGS. 10 and 11. The first operation example corresponds to a case where the information processing device 100 sets a plurality of divided sections without overlapping the divided sections each other. On the other hand, the second operation example corresponds to a case where the information processing device 100 sets a plurality of divided sections by overlapping the divided sections each other.

Figure 10:
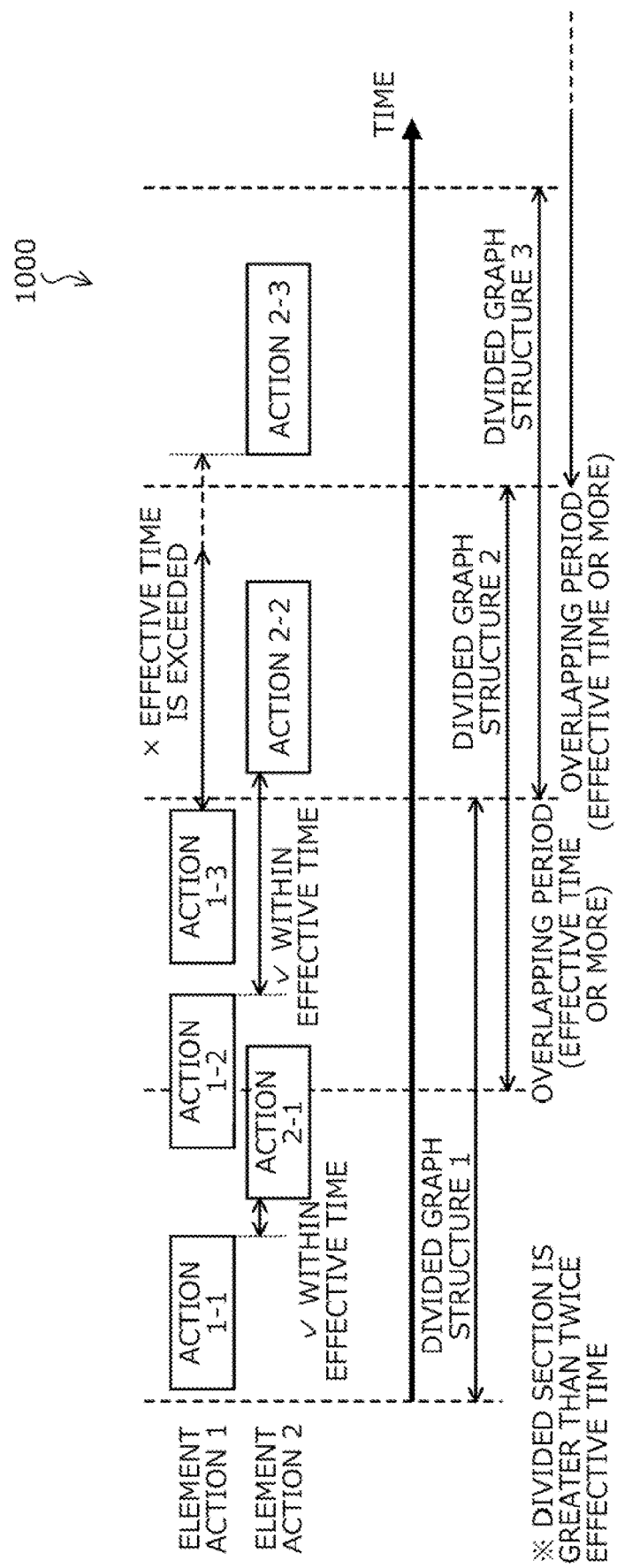
FIG. 10 is an explanatory diagram (part 1) illustrating a second operation example of the information processing device 100.
Figure 11:
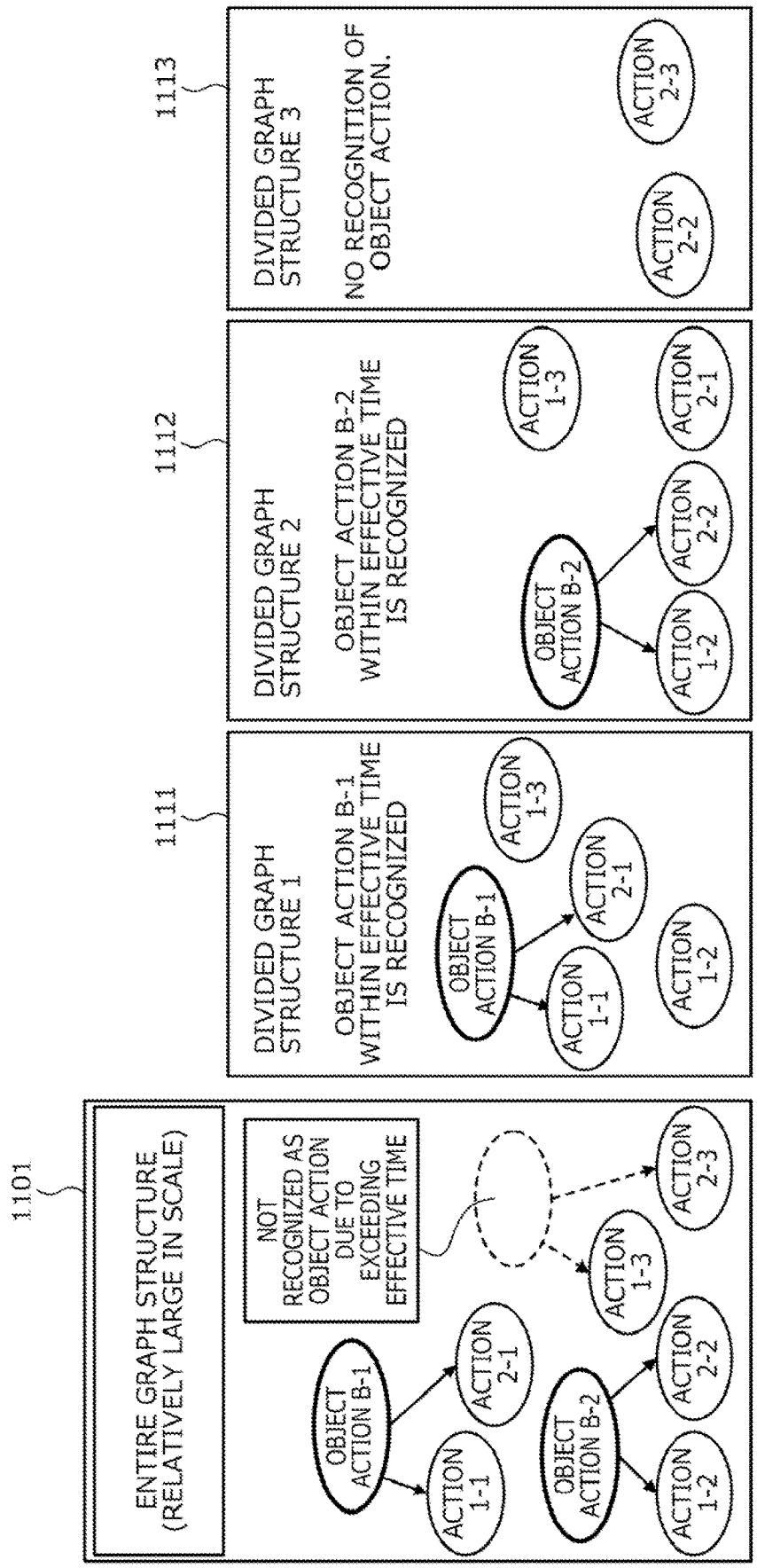
FIG. 11 is an explanatory diagram (part 2) illustrating the second operation example of the information processing device 100.

FIGS. 10 and 11 are explanatory diagrams illustrating the second operation example of the information processing device 100. In FIG. 10, it is assumed that an object action is formed by a combination of an element action 1 and an element action 2, in which a time interval between the respective element actions is within an effective time.

As in FIG. 5, it is assumed that, as a result of recognizing the element actions, the information processing device 100 generates and stores graph data representing a graph structure indicating a relationship between element actions for a plurality of element actions in an object period, as indicated by a reference numeral 1000. The plurality of element actions includes, for example, an action 1-$i$ as the element action 1 and an action 2-$j$ as the element action 2. The reference i denotes a positive integer. The reference j denotes a positive integer.

The information processing device 100 sets a plurality of divided sections by dividing the object period according to the effective time. Here, unlike in the first operation example, the information processing device 100 sets the plurality of divided sections by overlapping the divided sections each other. As the divided section, the information processing device 100 sets, for example, each of portions obtained by dividing the object period so that the divided sections overlap each other by an overlap time or more and become a time unit longer than twice the effective time. The overlap time is set to, for example, a time longer than the effective time.

The information processing device 100 extracts a plurality of pieces of partial data representing divided graph structures corresponding to the respective divided sections different from each other from the graph structure represented by relationship data. In the example of FIG. 10, the information processing device 100 extracts partial data representing a divided graph structure 1 including an action 1-1, an action 2-1, an action 1-2, and an action 1-3. In the example of FIG. 10, the information processing device 100 extracts partial data representing a divided graph structure 2 including the action 2-1, the action 1-2, the action 1-3, and an action 2-2. In the example of FIG. 10, the information processing device 100 extracts partial data representing a divided graph structure 3 including the action 2-2 and an action 2-3.

The information processing device 100 recognizes the object action for each divided section on the basis of the partial data corresponding to the divided section. In the example of FIG. 10, the information processing device 100 recognizes an object action formed by a combination of the action 1-1 and the action 2-1 on the basis of the partial data representing the divided graph structure 1. The information processing device 100 recognizes an object action formed by a combination of the action 1-2 and the action 2-2 on the basis of the partial data representing the divided graph structure 2. The information processing device 100 determines that an object action is not present on the basis of the partial data representing the divided graph structure 3.

With this configuration, the information processing device 100 may dispense with the need to inspect the entire object period by using the partial data representing the divided graph structure instead of the relationship data. Therefore, the information processing device 100 may dispense with the need to inspect a combination of the action 1-3 and the action 2-3 that have exceeded the effective time. The information processing device 100 may inspect only a combination of element actions having a relatively high probability of not exceeding the effective time. As a result, the information processing device 100 may reduce a processing time and processing load needed for recognizing the object action. Furthermore, since the information processing device 100 may make each of the divided section and the overlap time longer than the effective time, it is possible to reduce a probability of failing to recognize the object action.

The information processing device 100 may recognize the object action for each piece of partial data. The information processing device 100 may overlap the divided sections. Therefore, the information processing device 100 may facilitate recognition of an object action formed by a combination of two or more element actions, which is present over a beginning or end of any one of the divided sections, such as the combination of the action 1-2 and the action 2-2. As a result, the information processing device 100 may improve accuracy of recognizing the object action. Next, description of FIG. 11 will be made.

As illustrated in FIG. 11, a graph structure 1101 indicating a relationship between element actions for a plurality of element actions in an object period is relatively large in scale. Therefore, when trying to recognize various object actions on the basis of the graph structure 1101 by a prior art, the entire graph structure 1101 is repeatedly inspected, which tends to increase a processing load.

On the other hand, a graph structure 1111 obtained by dividing the graph structure 1101 is relatively small in scale. The graph structure 1111 corresponds to, for example, the divided graph structure 1 illustrated in FIG. 10. Therefore, when recognizing various object actions on the basis of the graph structure 1111, the information processing device 100 may suppress an increase in a processing load.

Similarly, a graph structure 1112 obtained by dividing the graph structure 1101 is relatively small in scale. The graph structure 1112 corresponds to, for example, the divided graph structure 2 illustrated in FIG. 10. Therefore, when recognizing various object actions on the basis of the graph structure 1112, the information processing device 100 may suppress an increase in a processing load.

Similarly, a graph structure 1113 obtained by dividing the graph structure 1101 is relatively small in scale. The graph structure 1113 corresponds to, for example, the divided graph structure 3 illustrated in FIG. 10. Therefore, when recognizing various object actions on the basis of the graph structure 1113, the information processing device 100 may suppress an increase in a processing load. In this way, the information processing device 100 may reduce a processing time and processing load needed for recognizing the object action.

(Generation Processing Procedure in Second Operation Example)

Since one example of a generation processing procedure in the second operation example, which is executed by the information processing device 100, is similar to the one example of the generation processing procedure in the first operation example illustrated in FIG. 8, for example, description thereof will be omitted.

(Recognition Processing Procedure in Second Operation Example)

Next, one example of a recognition processing procedure executed by the information processing device 100 in the second operation example will be described with reference to FIG. 12. Recognition processing in the second operation example is implemented by, for example, the processor 301, a storage area such as the memory 302 or the recording medium 305, and the network I/F 303 illustrated in FIG. 3.

Figure 12:
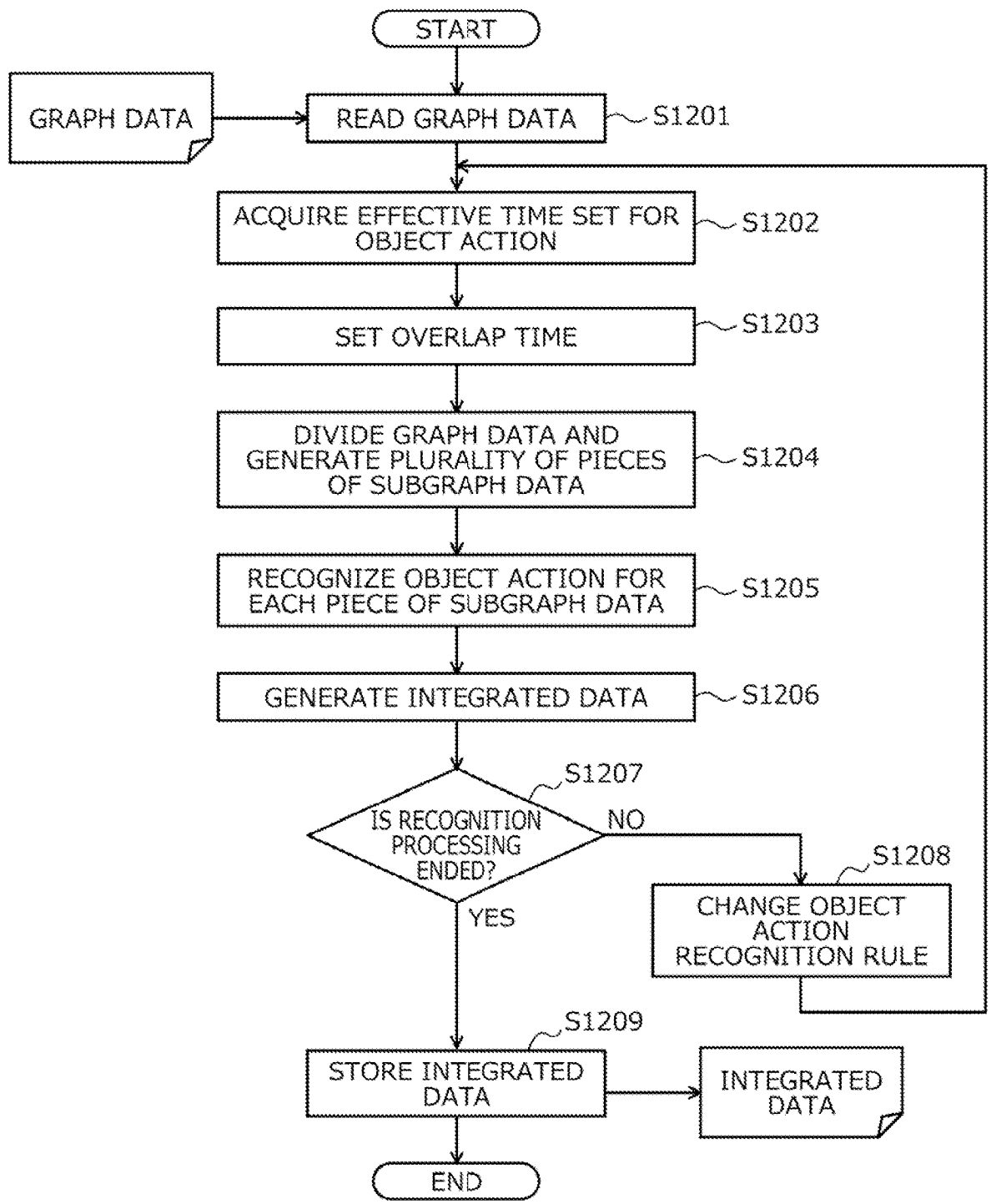
FIG. 12 is a flowchart illustrating one example of a recognition processing procedure in the second operation example.

FIG. 12 is a flowchart illustrating one example of the recognition processing procedure in the second operation example. In FIG. 12, the information processing device 100 reads graph data indicating a relationship between element actions (Step S1201).

Next, the information processing device 100 acquires an effective time set for an object action with reference to the recognition rule that makes it possible to recognize any one of object actions (Step S1202). Then, the information processing device 100 sets an overlap time Po exceeding the effective time (Step S1203).

Next, the information processing device 100 divides the graph data along a time axis on the basis of the effective time set for the object action and the overlap time Po, and generates a plurality of pieces of subgraph data (Step S1204). Then, the information processing device 100 recognizes the object action for each piece of subgraph data with reference to the object action recognition rule that makes it possible to recognize any one of object actions (Step S1205).

Next, the information processing device 100 generates integrated data obtained by integrating results of recognizing the object action (Step S1206). Then, the information processing device 100 determines whether or not to end the recognition processing (Step S1207). The information processing device 100 determines that the recognition processing is ended in a case where, for example, recognition of each object action of a plurality of preset object actions is ended. Here, in a case where the recognition processing is not ended (Step S1207: No), the information processing device 100 proceeds to processing in Step S1208. On the other hand, in a case where the recognition processing is ended (Step S1207: Yes), the information processing device 100 proceeds to processing in Step S1209.

In Step S1208, the information processing device 100 changes the object action recognition rule to be referred to so as to refer to an object action recognition rule that makes it possible to recognize another object action (Step S1208). Then, the information processing device 100 returns to the processing in Step S1202.

In Step S1209, the information processing device 100 stores the integrated data (Step S1209). Then, the information processing device 100 ends the recognition processing. With this configuration, the information processing device 100 may accurately recognize the object action.

(Third Operation Example of Information Processing Device 100)

Next, a third operation example of the information processing device 100 will be described with reference to FIGS. 13 and 14. The first operation example corresponds to a case where the information processing device 100 does not consider a combination of three or more element actions over a beginning or end of a divided section. On the other hand, the third operation example corresponds to a case where the information processing device 100 considers a combination of three or more element actions over a beginning or end of a divided section.

Figure 13:
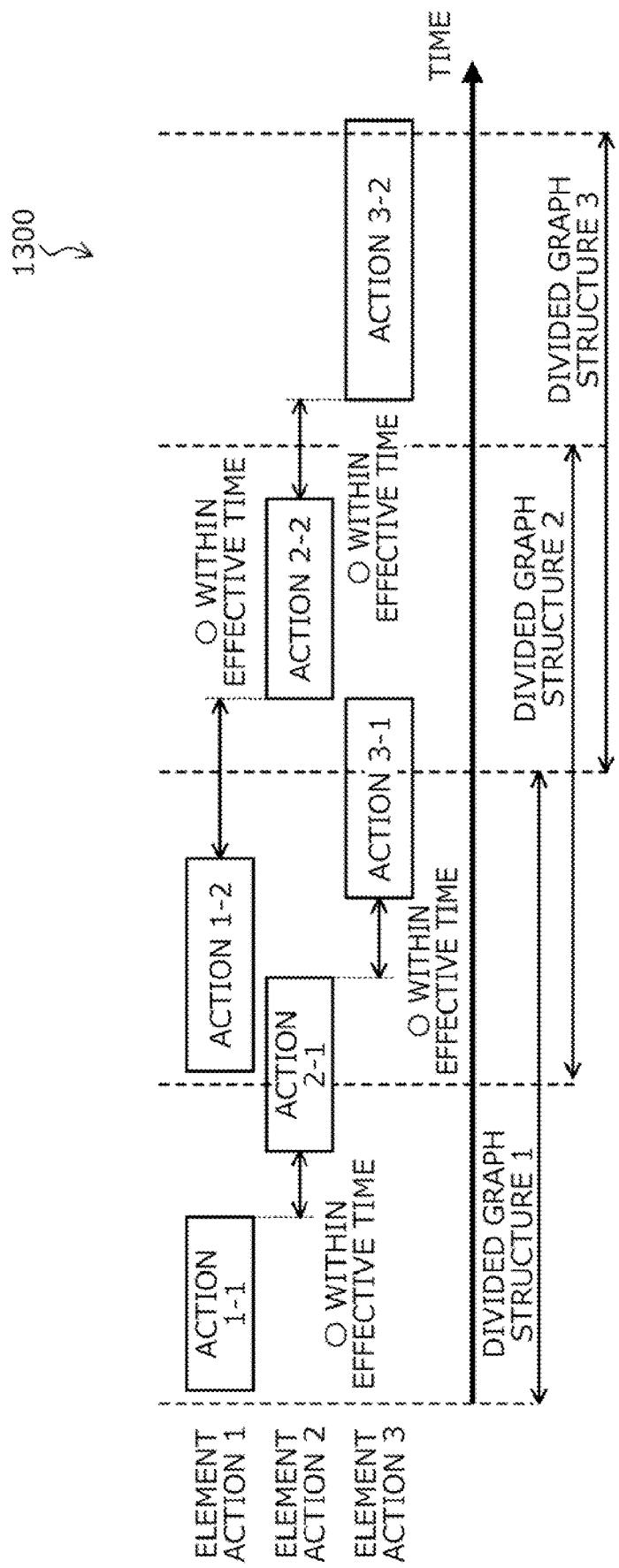
FIG. 13 is an explanatory diagram (part 1) illustrating a third operation example of the information processing device 100.
Figure 14:
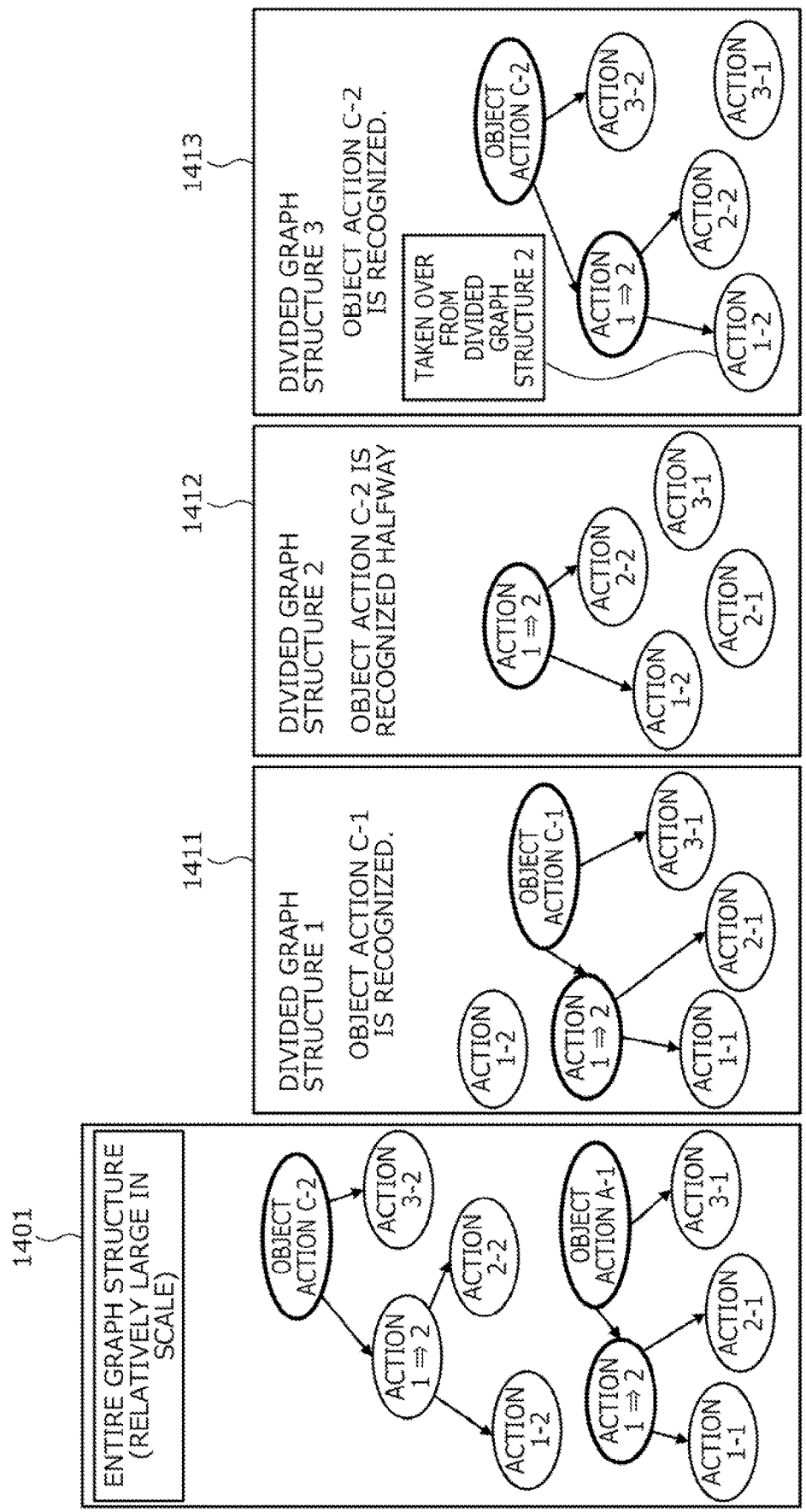
FIG. 14 is an explanatory diagram (part 2) illustrating the third operation example of the information processing device 100.

FIGS. 13 and 14 are explanatory diagrams illustrating the third operation example of the information processing device 100. In FIG. 13, it is assumed that an object action is formed by a combination of an element action 1, an element action 2, and an element action 3, in which a time interval between the respective element actions is within an effective time.

As in FIG. 5, it is assumed that, as a result of recognizing the element actions, the information processing device 100 generates and stores graph data representing a graph structure indicating a relationship between element actions for a plurality of element actions in an object period, as indicated by a reference numeral 1300. The plurality of element actions includes an action 1-$i$ as the element action 1, an action 2-$j$ as the element action 2, and an action 3-$k$ as the element action 3. The reference i denotes a positive integer. The reference j denotes a positive integer. The reference k denotes a positive integer.

The information processing device 100 sets a plurality of divided sections by dividing the object period according to the effective time. Here, unlike in the first operation example, the information processing device 100 sets the plurality of divided sections by overlapping the divided sections each other. As the divided section, the information processing device 100 sets, for example, each of portions obtained by dividing the object period so that the divided sections overlap each other by an overlap time or more and become a time unit longer than twice the effective time. The overlap time is set to, for example, a time longer than the effective time.

The information processing device 100 extracts a plurality of pieces of partial data representing divided graph structures corresponding to the respective divided sections different from each other from the graph structure represented by relationship data. In the example of FIG. 13, the information processing device 100 extracts partial data representing a divided graph structure 1 including an action 1-1, an action 2-1, an action 1-2, and an action 3-1. In the example of FIG. 13, the information processing device 100 extracts partial data representing a divided graph structure 2 including the action 2-1, the action 1-2, the action 3-1, and an action 2-2. In the example of FIG. 13, the information processing device 100 extracts partial data representing a divided graph structure 3 including the action 3-1, the action 2-2, and an action 3-2.

The information processing device 100 recognizes the object action in order from a divided section at a beginning on the basis of the partial data corresponding to the divided section. In the example of FIG. 13, the information processing device 100 recognizes an object action formed by a combination of the action 1-1, the action 2-1, and the action 3-1 on the basis of the partial data representing the divided graph structure 1.

The information processing device 100 recognizes that an object action is not present in the divided section corresponding to the divided graph structure 2 on the basis of the partial data representing the divided graph structure 2. The information processing device 100 detects a combination of the action 1-2 and the action 2-2 forming the first half of an object action in the divided section corresponding to the divided graph structure 2 on the basis of the partial data representing the divided graph structure 2. In this case, it is assumed that the information processing device 100 uses the detected combination of the action 1-2 and the action 2-2 forming the first half of the object action when the object action is recognized in the divided section corresponding to the divided graph structure 3.

The information processing device 100 recognizes the object action on the basis of the detected combination of the action 1-2 and the action 2-2 forming the first half of the object action and the partial data representing the divided graph structure 3. The information processing device 100 recognizes, for example, an object action formed by a combination of the action 1-2, the action 2-2, and the action 3-2, which is present over a plurality of divided sections.

With this configuration, the information processing device 100 may dispense with the need to inspect the entire object period by using the partial data representing the divided graph structure instead of the relationship data. As a result, the information processing device 100 may reduce a processing time and processing load needed for recognizing the object action.

In a case where one or more element actions forming the first half of the object action are present in any one of the divided sections, the information processing device 100 may use, in the subsequent divided section, the one or more element actions when the object action is recognized. Therefore, the information processing device 100 may facilitate recognition of the object action formed by the combination of two or more element actions, which is present over the beginning or end of any one of the divided sections. As a result, the information processing device 100 may improve accuracy of recognizing the object action. Next, description of FIG. 14 will be made.

As illustrated in FIG. 14, a graph structure 1401 indicating a relationship between element actions for a plurality of element actions in an object period is relatively large in scale. Therefore, when trying to recognize various object actions on the basis of the graph structure 1401 by a prior art, the entire graph structure 1401 is repeatedly inspected, which tends to increase a processing load.

On the other hand, a graph structure 1411 obtained by dividing the graph structure 1401 is relatively small in scale. The graph structure 1411 corresponds to, for example, the divided graph structure 1 illustrated in FIG. 13. Therefore, when recognizing various object actions on the basis of the graph structure 1411, the information processing device 100 may suppress an increase in a processing load.

Similarly, a graph structure 1412 obtained by dividing the graph structure 1401 is relatively small in scale. The graph structure 1412 corresponds to, for example, the divided graph structure 2 illustrated in FIG. 13. Therefore, when recognizing various object actions on the basis of the graph structure 1412, the information processing device 100 may suppress an increase in a processing load.

Similarly, a graph structure 1413 obtained by dividing the graph structure 1401 is relatively small in scale. The graph structure 1413 corresponds to, for example, the divided graph structure 3 illustrated in FIG. 13 to which the action 1-2 forming the first half of the element action is added. Therefore, when recognizing various object actions on the basis of the graph structure 1413, the information processing device 100 may suppress an increase in a processing load. In this way, the information processing device 100 may reduce a processing time and processing load needed for recognizing the object action.

(Recognition Processing Procedure in Third Operation Example)

Next, one example of a recognition processing procedure executed by the information processing device 100 in the third operation example will be described with reference to FIG. 15. Recognition processing in the third operation example is implemented by, for example, the processor 301, a storage area such as the memory 302 or the recording medium 305, and the network I/F 303 illustrated in FIG. 3.

Figure 15:
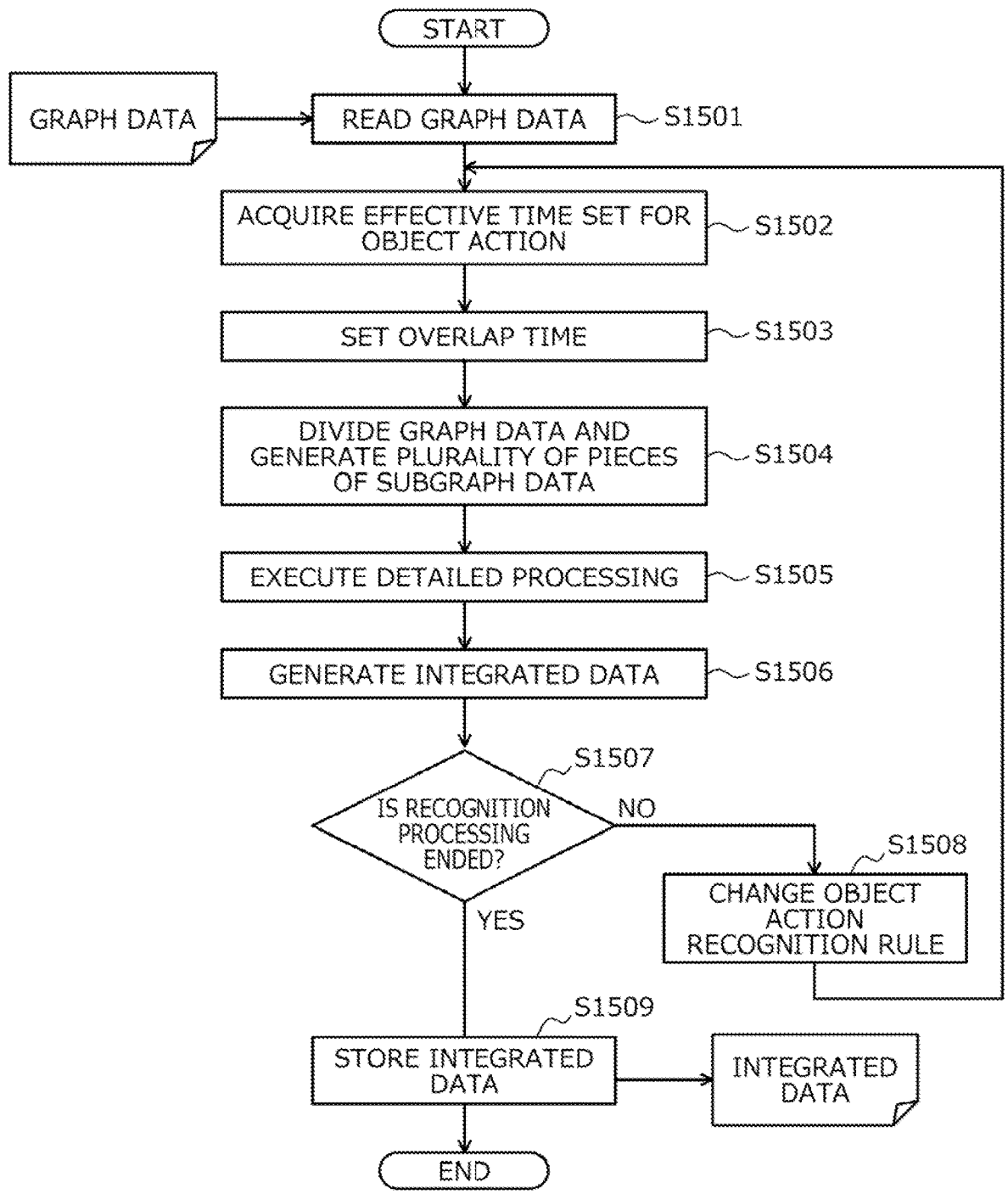
FIG. 15 is a flowchart illustrating one example of a recognition processing procedure in the third operation example.

FIG. 15 is a flowchart illustrating one example of the recognition processing procedure in the third operation example. In FIG. 15, the information processing device 100 reads graph data indicating a relationship between element actions (Step S1501).

Next, the information processing device 100 acquires an effective time set for an object action with reference to the recognition rule that makes it possible to recognize any one of object actions (Step S1502). Then, the information processing device 100 sets an overlap time Po exceeding the effective time (Step S1503).

Next, the information processing device 100 divides the graph data along a time axis on the basis of the effective time set for the object action and the overlap time Po, and generates a plurality of pieces of subgraph data (Step S1504). Then, the information processing device 100 recognizes the object action for each piece of subgraph data by performing detailed processing described later in FIG. 16 with reference to the object action recognition rule that makes it possible to recognize any one of object actions (Step S1505).

Next, the information processing device 100 generates integrated data obtained by integrating results of recognizing the object action (Step S1506). Then, the information processing device 100 determines whether or not to end the recognition processing (Step S1507). The information processing device 100 determines that the recognition processing is ended in a case where, for example, recognition of each object action of a plurality of preset object actions is ended. Here, in a case where the recognition processing is not ended (Step S1507: No), the information processing device 100 proceeds to processing in Step S1508. On the other hand, in a case where the recognition processing is ended (Step S1507: Yes), the information processing device 100 proceeds to processing in Step S1509.

In Step S1508, the information processing device 100 changes the object action recognition rule to be referred to so as to refer to an object action recognition rule that makes it possible to recognize another object action (Step S1508). Then, the information processing device 100 returns to the processing in Step S1502.

In Step S1509, the information processing device 100 stores the integrated data (Step S1509). Then, the information processing device 100 ends the recognition processing. With this configuration, the information processing device 100 may accurately recognize the object action.

(Detailed Processing Procedure in Third Operation Example)

Next, one example of a detailed processing procedure executed by the information processing device 100 in the third operation example will be described with reference to FIG. 16. Detailed processing in the third operation example is implemented by, for example, the processor 301, a storage area such as the memory 302 or the recording medium 305, and the network I/F 303 illustrated in FIG. 3.

Figure 16:
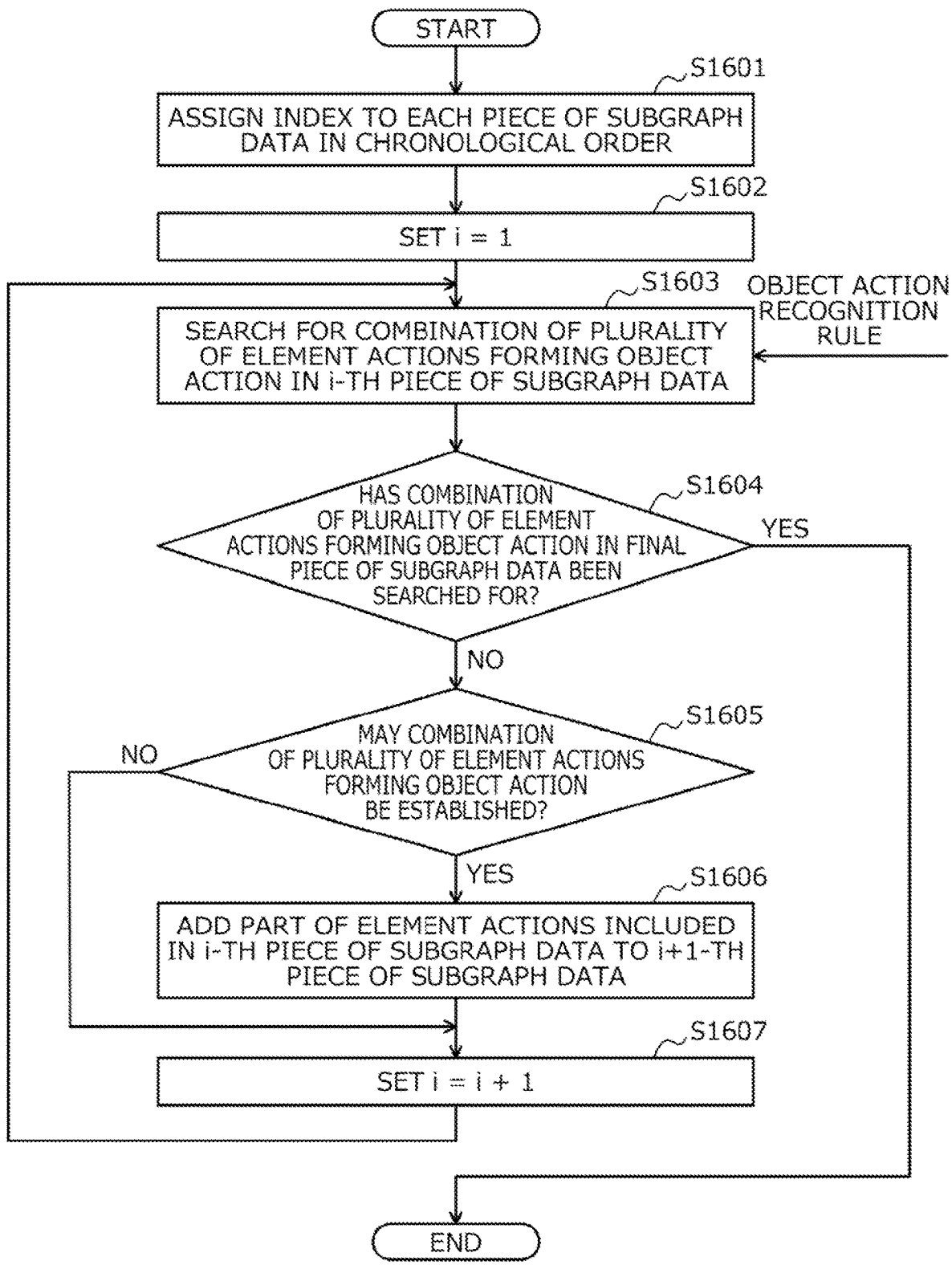
FIG. 16 is a flowchart illustrating one example of a detailed processing procedure in the third operation example.

FIG. 16 is a flowchart illustrating one example of the detailed processing procedure in the third operation example. In FIG. 16, the information processing device 100 assigns an index to each piece of subgraph data in chronological order (Step S1601). The index is, for example, 1, 2, . . . , N–1, N.

Next, the information processing device 100 sets i=1 (Step S1602). Then, the information processing device 100 recognizes the object action by searching for a combination of a plurality of element actions forming an object action in an i-th piece of subgraph data with reference to the object action recognition rule that makes it possible to recognize any one of object actions (Step S1603).

Next, the information processing device 100 determines whether or not a combination of a plurality of element actions forming an object action in a final piece of subgraph data has been searched for (Step S1604). Here, in a case where the combination of the plurality of element actions has been searched for (Step S1604: Yes), the information processing device 100 ends the detailed processing. On the other hand, in a case where the combination of the plurality of element actions has not been searched for (Step S1604: No), the information processing device 100 proceeds to processing in Step S1605.

In Step S1605, the information processing device 100 determines whether or not a combination of a plurality of element actions forming an object action from the i-th piece of subgraph data over an i+1-th piece of subgraph data may be established. (Step S1605). Here, in a case where the combination of the plurality of element actions may not be established (Step S1605: No), the information processing device 100 proceeds to the processing in Step S1607. On the other hand, in a case where the combination of the plurality of element actions may be established (Step S1605: Yes), the information processing device 100 proceeds to processing in Step S1606.

In Step S1606, the information processing device 100 adds a part of element actions included in the i-th piece of subgraph data to the i+1-th piece of subgraph data in the combination of the plurality of element actions that may be established (Step S1606). Next, the information processing device 100 sets i=i+1 (Step S1607). Then, the information processing device 100 returns to the processing in Step S1603. With this configuration, the information processing device 100 may improve accuracy of recognizing the object action.

As described above, according to the information processing device 100, it is possible to acquire data indicating a relationship between element actions for a plurality of element actions in an object period. According to the information processing device 100, it is possible to acquire an effective time corresponding to an object action. According to the information processing device 100, it is possible to search for a combination of two or more element actions forming the object action among the plurality of element actions for each divided section set by dividing the object period according to the acquired effective time on the basis of the acquired data. With this configuration, the information processing device 100 may facilitate recognition of the object action. The information processing device 100 may, for example, reduce a processing time and processing load needed for recognizing the object action.

According to the information processing device 100, it is possible to search for, among the plurality of element actions, a combination of two or more element actions forming the object action, in which a time interval between at least any of the element actions in the combination is the acquired effective time or less. With this configuration, the information processing device 100 may recognize the object action. The information processing device 100 may recognize a relatively complex object action on the basis of the effective time.

According to the information processing device 100, it is possible to detect, on the basis of a result of recognizing a thing appearing in a moving image in the object period, an element action related to the thing by using a predetermined model. According to the information processing device 100, it is possible to generate, for each detected element action, data including the detected element action in association with a time when the detected element action has been performed. With this configuration, the information processing device 100 may use the element action that may be detected by the predetermined model when the object action is recognized. The information processing device 100 may acquire data without cooperating with another computer.

According to the information processing device 100, it is possible to further detect another element action that is a combination of the detected element actions. With this configuration, the information processing device 100 may use another element action that is a combination of two or more element actions when the object action is recognized. The information processing device 100 may acquire data without cooperating with another computer.

According to the information processing device 100, it is possible to set a plurality of the divided sections by dividing the object period such that the divided sections overlap each other for at least the acquired effective time or more. With this configuration, the information processing device 100 may make it difficult to overlook a combination of two or more element actions forming the object action, which is present over a beginning or end of any one of the divided sections.

According to the information processing device 100, it is possible to determine whether or not a part of element actions included in the combination of two or more element actions forming the object action is present in a first divided section among the divided sections set by dividing the object period. According to the information processing device 100, when the part of the element actions is present, it is possible to search for remaining element actions included in the combination in a second divided section after the first divided section. With this configuration, the information processing device 100 may make it difficult to overlook a combination of two or more element actions forming the object action, which is present over a beginning or end of any one of the divided sections.

According to the information processing device 100, it is possible to adopt a type of action that may be detected by using the predetermined model as the element action. According to the information processing device 100, it is possible to adopt a type of action that may not be detected by using the predetermined model as the object action. With this configuration, it is possible for the information processing device 100 to dispense with the need to train a model that may detect the object action. Therefore, the information processing device 100 may reduce a processing time and processing load needed for recognizing the object action.

According to the information processing device 100, it is possible to output a search result. With this configuration, the information processing device 100 may make the search result available.

According to the information processing device 100, it is possible to use the predetermined model that makes it possible to recognize a skeleton position of a person. According to the information processing device 100, on the basis of a result of recognizing a skeleton position of a person appearing in a moving image on the basis of the moving image, an element action related to the person is detected by using the predetermined model. With this configuration, the information processing device 100 may accurately recognize the element action related to a person.

According to the information processing device 100, it is possible to generate data indicating a graph structure formed by a node indicating the element action in association with a time when the element action has been performed, and an edge indicating an inclusion relationship between the element action and another element action that is a combination of two or more element actions. With this configuration, the information processing device 100 may acquire data without cooperating with another computer.

Note that the information processing method described in the present embodiment may be implemented by executing a program prepared in advance, on a computer such as a PC or a workstation. The information processing program described in the present embodiment is executed by being recorded on a computer-readable recording medium and being read from the recording medium by the computer. The recording medium is a hard disk, a flexible disk, a compact disc (CD)-ROM, a magneto-optical disc (MO), a digital versatile disc (DVD), or the like. Furthermore, the information processing program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute processing comprising:
    acquiring data that indicates a relationship between element actions for a plurality of element actions in an object period;
    acquiring an effective time that corresponds to an object action; and
    searching for a combination of two or more element actions that form the object action among the plurality of element actions for each divided section set by dividing the object period according to the acquired effective time on the basis of the acquired data,
    wherein in the processing of searching, among the plurality of element actions, a combination of two or more element actions that form the object action, in which a time interval between at least any of the element actions in the combination is the acquired effective time or less is searched for.

2. The non-transitory computer-readable recording medium according to claim 1, for causing the computer to execute the processing further comprising detecting, on the basis of a result of recognizing a thing that appears in a moving image in the object period, an element action related to the thing by using a predetermined model, wherein, in the processing of acquiring the data, for each detected element action, data that includes the detected element action in association with a time when the detected element action has been performed is generated.

3. The non-transitory computer-readable recording medium according to claim 2, wherein in the processing of detecting, another element action that is a combination of the detected element actions is further detected.

4. The non-transitory computer-readable recording medium according to claim 2, wherein in the processing of acquiring the data, data that indicates a graph structure formed by a node that indicates the detected element action in association with a time when the detected element action has been performed, and an edge that indicates an inclusion relationship between the detected element action and another element action that is a combination of two or more detected element actions is generated.

5. The non-transitory computer-readable recording medium according to according to claim 2, wherein the predetermined model is a model that makes it possible to recognize a skeleton position of a person, and in the processing of detecting, on the basis of a result of recognizing a skeleton position of a person who appears in the moving image on the basis of the moving image, an element action related to the person is detected by using the predetermined model.

6. The non-transitory computer-readable recording medium according to claim 1, for causing the computer to execute the processing further comprising setting a plurality of the divided sections by dividing the object period such that the divided sections overlap each other for at least the acquired effective time or more.

7. The non-transitory computer-readable recording medium according to claim 1, wherein in the processing of searching, when a part of element actions included in a combination of two or more element actions that form the object action is present in a first divided section among the divided sections set by dividing the object period, remaining element actions included in the combination is searched for in a second divided section after the first divided section.

8. The non-transitory computer-readable recording medium according to according to claim 1, wherein the element action is a type of action that is detectable by using a predetermined model, and the object action is a type of action that is undetectable by using the predetermined model.

9. The non-transitory computer-readable recording medium according to claim 1, for causing the computer to execute the processing further comprising: outputting a search result.

10. An information processing method comprising:
acquiring data that indicates a relationship between element actions for a plurality of element actions in an object period;
acquiring an effective time that corresponds to an object action; and
searching for a combination of two or more element actions that form the object action among the plurality of element actions for each divided section set by dividing the object period according to the acquired effective time on the basis of the acquired data,
wherein in the processing of searching, among the plurality of element actions, a combination of two or more element actions that form the object action, in which a time interval between at least any of the element actions in the combination is the acquired effective time or less is searched for.

11. An information processing device comprising:
a memory; and
a processor coupled to the memory and configured to:
acquire data that indicates a relationship between element actions for a plurality of element actions in an object period;
acquire an effective time that corresponds to an object action; and
search for a combination of two or more element actions that form the object action among the plurality of element actions for each divided section set by dividing the object period according to the acquired effective time on the basis of the acquired data,
wherein in the processing to search, among the plurality of element actions, a combination of two or more element actions that form the object action, in which a time interval between at least any of the element actions in the combination is the acquired effective time or less is searched for.

* * * * *